(12) United States Patent
Bimber et al.

(10) Patent No.: US 6,803,928 B2
(45) Date of Patent: Oct. 12, 2004

(54) EXTENDED VIRTUAL TABLE: AN OPTICAL EXTENSION FOR TABLE-LIKE PROJECTION SYSTEMS

(75) Inventors: Oliver Bimber, Rostock (DE); L. Miguel Encarnacao, Warwick, RI (US); Andre Stork, Darmstadt (DE)

(73) Assignee: Fraunhofer-Gesellschaft zur Foerderung der angewandten Forschung e.V. (DE)

(*) Notice: Subject to any disclaimer, the term of this patent is extended or adjusted under 35 U.S.C. 154(b) by 0 days.

(21) Appl. No.: 10/031,465
(22) PCT Filed: Jun. 6, 2001
(86) PCT No.: PCT/US01/18327
§ 371 (c)(1),
(2), (4) Date: Jan. 17, 2002
(87) PCT Pub. No.: WO01/95061
PCT Pub. Date: Dec. 13, 2001

(65) Prior Publication Data
US 2003/0085866 A1 May 8, 2003

Related U.S. Application Data
(60) Provisional application No. 60/209,672, filed on Jun. 6, 2000, and provisional application No. 60/210,315, filed on Jun. 8, 2000.

(51) Int. Cl.[7] .............................................. G09G 5/00
(52) U.S. Cl. ........................ 345/757; 345/7; 345/419
(58) Field of Search ................................ 345/433, 419, 345/757, 7, 8, 9, 755; 340/980; 342/463; 359/480

(56) References Cited
U.S. PATENT DOCUMENTS
5,644,324 A * 7/1997 Maguire, Jr. .................... 345/9
(List continued on next page.)

FOREIGN PATENT DOCUMENTS
WO    PCT/US99/28930    12/1999

OTHER PUBLICATIONS
Massie and Salisbury, "The Phantom Haptic Interface: A Device for Probing Virtual Objects", ASME Winter Annual Meeting, Nov. 1994.

(List continued on next page.)

Primary Examiner—Dennis-Doon Chow
Assistant Examiner—Srilakshmi K. Kumar
(74) Attorney, Agent, or Firm—Gordon E. Nelson

(57) ABSTRACT

Apparatus that uses a large transflective mirror to extend a virtual reality system such as a virtual table that employs a projection plane to produce the virtual reality. The transflexive mirror is positioned relative to the projection plane such that the plane of the mirror intersects the projection plane and the angle of the mirror relative to the projection plane is such that the user of the system who looks at the mirror sees the projection plane reflected in the mirror. The virtual reality system is responsive to the position of the mirror and the direction in which a user is looking and produces separate virtual realities on the projection plane: one when the user is looking at the mirror and another when the user is looking at the projection plane. The virtual reality that the user sees when looking at the mirror may or may not be coherent with the virtual reality that the user sees when looking at the projection plane. The two virtual realities may share a global coordinate system that is divided into two parts by the plane of the mirror, and what the user sees when looking into the mirror may be what the user would see looking through a window into the part of the global coordinate system behind the mirror. Because the mirror is transflective, real objects whose locations are known to the virtual reality system can he placed behind the mirror and the virtual reality reflected in the mirror may be used to augment the real objects. One use of such augmentation is virtual trial assembly of a virtual mockup with a physical mockup.

15 Claims, 15 Drawing Sheets

U.S. PATENT DOCUMENTS

| | | | | | |
|---|---|---|---|---|---|
| 694,142 | A | * | 12/1997 | Dumoulin et al. | 345/9 |
| 5,736,990 | A | * | 4/1998 | Barrus et al. | 345/630 |
| 5,812,257 | A | * | 9/1998 | Teitel et al. | 342/463 |
| 5,861,994 | A | * | 1/1999 | Kelly | 359/480 |
| 5,991,085 | A | * | 11/1999 | Rallison et al. | 345/8 |
| 6,304,263 | B1 | * | 10/2001 | Chiabrera et al. | 345/419 |
| 6,411,266 | B1 | * | 6/2002 | Maguire, Jr. | 340/980 |

OTHER PUBLICATIONS

Raskar, Welch, Fuchs, "Spatially Augmented Reality", First International Workshop on Augmented Reality, San Francisco, Nov. 1, 1998.

Raskar, Welch, Chen, "Table–Top Spatially–Augmented Reality: Physical Models to Life with Projected Imagery", 1998.

Cruz–Neira, Sandin, Defanti "Surround–Screen Projection–Based Virtual Reality: The Design and Implementation of the CAVE", Computer Graphics, Proceedings of SIGGRAPH '93, pp. 135–142.

Kijima and Ojika, "Transition Between Virtual Environment and Workstation Environment with Projective Head Mounted Display", in Proceedings of IEEE Virtual Reality Annual International Symposium, pp. 130–137.

Von Wiegand, Schloerb, Sachtler, "Virtual Workbench: Near–Field Virtual Environment System with Applications", Presence, vol. 8, No. 5, Oct. 1999, pp. 492–519.

Fuchs, "The Office of the Future", http://cs.unc.edu/–raskar/Office/.

"ImmersaDesk M1", Fakespace systems, 2003.

Barco, "Virtual Surgery Table", Barco Projection Systems, Jan. 2000.

Barco, "Baron High–Performance Projection Table", Barco Projection Systems, Jul. 2002.

* cited by examiner

EXTENDED VIRTUAL TABLE: AN OPTICAL EXTENSION FOR TABLE-LIKE PROJECTION SYSTEMS

CROSS REFERENCES TO RELATED APPLICATIONS

This patent application claims priority from U.S. Provisional Application No. 60/209,672, O. Bimber, et al., Extended virtual table, filed Jun. 6, 2000 and from U.S. Provisional Application No. 60/210,315, O. Bimber, et al., Extended virtual table, filed Jun. 8, 2000 and will be a continuation-in-part of the US national stage patent application corresponding to PCT/US99/28930 M. Encarnacão, et al., Tools for interacting with virtual environments, filed Dec. 7, 1999 with a priority date of Apr. 22, 1999. The application contains the complete discussion of the use of mirrors in virtual tables from PCT/US99/28930.

BACKGROUND OF THE INVENTION

1. Field of the Invention

The invention relates generally to virtual and augmented environments and more specifically to the application of mirror beam-splitters as optical combiners in combination with table-like projection systems that are used to visualize such environments.

2. Background

Virtual Reality (VR) attempts to provide a sense of spatial presence (visual, auditory, or tactile) inside computer-generated synthetic environments to the user. Opaque head-mounted displays (HMDs) and surround-screen (spatially immersive) displays such as CAVEs, (Cruz-Neira, Sandin & DeFanti, 1993) and domed displays (Bennett, 2000) are VR devices that surround the viewer with graphics by filling a great amount of the user's field of view. To achieve this kind of immersion, however, these devices encapsulate the user from the real world, thus making it in many cases difficult or even impossible to combine them with habitual work environments.

Other, less immersive display technology is more promising to support seamless integration of VR into everyday workplaces. Table-like display devices such as Virtual Tables (Barco Inc., 2000a, 2000b) or Responsive Workbenches (Krüger & Fröhlich, 1994; Krüger, et al., 1995) and wall-like projection systems such as e.g., Powerwalls, (Silicon Graphics, Inc., 1997) allow the user to simultaneously perceive the surrounding real world while working with a virtual environment.

UNC's "Office of the Future Vision" (Raskar, et al., 1998) is a consequent extension of this concept. Here, in contrast to embedding special display devices into the real work environment, an office is envisioned where the ceiling lights are replaced by cameras and projectors that continuously scan the office environment and project computer graphics to spatially immersive displays that could in effect be almost anything (e.g., walls, tables, cupboards) or anywhere in the office. While the cameras acquire the geometry of the office items (irregular surfaces), the rendering is modified to project graphics onto these surfaces in a way that it looks correct and undistorted to an observer. This concept can offer both, a high degree of immersion and the integration of VR into the habitual workspace.

Due to currently employed display technology, a main drawback of VR is that virtual environments cannot be optically mixed with the real world. If rear-projection systems are employed, real-world objects are always located between the observer and the projection plane, thus occluding the projected graphics and consequently the virtual environment. If front-projection is used, physical models can be augmented with graphics by seamlessly projecting directly onto the surface of those objects instead of displaying them in the viewer's visual field (Raskar, Welch & Chen, 1999; Raskar, Welch & Fuchs, 1998). However, this so-called Spatially Augmented Reality (SAR) concept is mostly limited to visualization and not suitable for advanced interaction with virtual and augmented real objects. Moreover, shadows that are cast by the physical objects or by the user, and restrictions of the display area (size, shape, and color of the surface) introduce a fundamental problem in SAR systems.

In general, Augmented Reality (AR) superimposes computer-generated graphics onto the user's view of the real world, thus, in contrast to VR, allowing virtual and real objects to coexist within the same space. Opaque HMDs that display a video-stream of the real world which is premixed with graphics, or see-through HMDs (Sutherland, 1965; Bajura, 1992) that make use of optical combiners (essentially half-silvered mirrors) are currently the two main display devices for AR. Similar to VR, the display technology that is employed for AR introduces a number of drawbacks: For currently available HMDs, display characteristics (e.g., resolution, field-of-view, focal-length, field-of-depth, etc.) and ergonomic factors usually interfere. While the resolution of both HMD types (opaque and see-through) is generally low (lower than projection-based VR display devices), today's optical see-through systems additionally lack in image brilliance, because the brightness of the displayed graphics strongly depend on the lighting conditions of the surrounding real environment. Although higher-resolution see-through HMDs do exist, e.g. Kaiser Electro-optics, Inc. (2000), they are mostly heavy and expensive, whereas more ergonomic HMDs lack in their optical properties.

Head-mounted projective displays (Parsons & Rolland, 1998; Inami, et al., 2000) or projective head-mounted displays (Kijima & Ojika, 1997) are projection-based alternatives that apply head-mounted miniature projectors instead of miniature displays. Such devices approach to combine the advantages of large projection displays with the ones of head-mounted displays. Similar to SAR, head-mounted projective displays decrease the effect of inconsistency of accommodation and convergence that is related to head-mounted displays. Both, head-mounted projective displays and projective head-mounted displays also address other problems that are related to HMDs: they provide a larger field of view without the application of additional lenses that introduce distorting arbitrations and they prevent incorrect parallax distortions caused by IPD (inter pupil distance) mismatch that occurs if HMDs are worn incorrectly (e.g. if they slip slightly from their designed position). However, as HMDs they seriously suffer from the imbalanced ratio between heavy optics (or projectors) that results in cumbersome and uncomfortable devices or ergonomic devices with a poor image quality.

Although some researchers refer to AR as a variation of VR, e.g. Azuma (1997), a strong separation between AR and VR applications does exist, which, in our opinion, is mainly caused by the technologically constrained usage of different display devices.

In this article, we introduce a prototype of a cost-effective and simple-to-realize optical extension for single-sided or multiple-sided (i.e. L-shaped) table-like projection systems. A large half-silvered mirror beam-splitter is applied to extend both viewing and interaction space beyond the projection boundaries of such devices. The beam-splitter allows a non-simultaneous extension of exclusively virtual environments and enables these VR display devices to support Augmented Reality tasks. Consequently, the presented prototype features a combination of VR and AR. Since table-like display devices can easily be integrated into habitual work-environments, the extension allows the linkage of a virtual with a real work place (e.g., a table-like projection system with a neighboring real workbench).

Compared to current HMDs, the application of a spatial projection displays (such as the prototype described here) for Augmented Reality tasks feature an improved ergonomics, a large field-of-view, a high and scalable resolution, and an easier eye accommodation (Raskar, Welch & Fuchs, 1998). In contrast to Raskar's SAR concept, however, our optical see-through approach prevents shadow casting and does not restrict the display area to the real environment's surface.

DESCRIPTION OF RELATED ART

Since the Extended Virtual Table prototype represents a combination of a table-like display and a mirror beam-splitter this section discusses previous and related works from two areas: table-like projection systems and related mirror displays.

First, we give an overview of current table-like projection technology in subsection 2.1. This is followed by a discussion on related mirror displays in section 2.2.

Table-like Projection Systems

Krüger's Responsive Workbench (Krüger & Fröhlich, 1994; Krüger, et al., 1995) is one of the pioneering table-like projection systems. The Responsive Workbench consists of a video projector that projects high-resolution stereoscopic images onto a mirror located under the table, which in turn reflects it in the direction of the table top (a ground glass screen). Analyzing the daily work situation of different types of computer users, Krüger et al. chose a workbench-like system as an adaptation to the human living and working environment.

Using the Responsive Workbench metaphor, a rich palette of similar rear-projection devices is available today that mainly differ in size, mobility and applied projection technology. Among these systems are Wavefront's ActiveDesk, Barco's (2000a) BARON, Fakespace's Immersadesk Series (Fakespace Systems, Inc., 2000), and also the Responsive Workbench itself, which is sold by TAN Projectiontechnologies (2000).

While all of the above mentioned systems are single-sided projection devices, a few two-sided (L-shaped) systems have been developed to offer a larger and a (by the normally limited projection area) less constrained viewing space. TAN's Holobench (TAN Projectiontechnologies, 2000), for instance, is an extension of the Responsive Workbench, and Barco's (2000b) Consul has been developed based on the BARON Virtual Table.

Within the previous six years, an enormous variety of applications (concerning almost all VR areas) that involve table-like projection systems have been described. To mention all of these developments would be beyond the scope of this article.

2.2 Related-Mirror Displays

As for stereoscopic screen-based desktop systems, occlusion caused by the user's hand or hand-held input devices is a main drawback of table-like rear-projection systems. This disadvantage makes a visually undistorted direct interaction with the presented virtual scene difficult—especially if force-feedback devices such as a PHANTOM (Massie & Salisbury, 1994), etc., are applied to superimpose virtual visual and virtual haptic spaces.

A number of devices have been developed during the last years that allow the user to reach into a virtual scene without causing any occlusion. These, so-called "reach-in systems" apply a horizontally arranged small mirror to reflect the graphics that is displayed on a CRT screen (mounted above the mirror). While the user is looking at the mirror, she can simultaneously operate a spatial input device (below the mirror) that—in most cases—provides force-feedback in relation to the stereoscopically displayed visual information. Since usually neither the input device, nor the user's hands are visible by looking at the mirror, the virtual environment can be visually perceived in accordance with the corresponding haptic information without causing visual conflicts produced by occlusion.

Knowlton (1977), for instance, overlaid monoscopic 2D keycap graphics on the user's view of an otherwise conventional keyboard by using a half-silvered mirror that reflected a CRT screen. This allowed the graphics to annotate the user's fingers (within the illuminated workspace below the mirror) instead of being blocked them.

Schmandt's Stereoscopic Computer Graphic Workstation (Schmandt, 1983) is another early example of such a reach-in arrangement that applies an electromagnetic tracking device for input in combination with a CRT screen and a half-silvered mirror. He superimposed 3D graphics over the transmitted image of the working area below the mirror.

Poston and Serra (1994) developed the Virtual Workbench, but used a mechanical input device to overcome the magnetic field distortion problems of Schmandt's setup, which were caused by the interference between the CRT screen and Schmandt's electromagnetic tracking device.

A more recent development is the apparatus by Wiegand, Schloerb and Sachtler (1999) which they also named Virtual Workbench. Their system offers a trackball for input, a Phantom for input and additional force feedback, and stereo speakers for auditory feedback.

Due to the small working volume of these devices, their applications are limited to near-field operations. Although some of the mentioned systems employ half-silvered mirrors instead of full mirrors for calibration purposes, only a few support Augmented Reality tasks. The maturity of systems, however, renders exclusively virtual 'visual and haptic' information. Several of these devices are commercially available (e.g., the Reach-In Display by Reach-In Technologies (2000) or the Dextroscope by the Medical Imaging Group (2000)) and are mainly used for medical/industrial simulation and training, or psychophysics and training research (Wiegand, Schloerb & Sachtler, 1999).

Bimber, Encarnacāo & Schmalstieg (2000a), PCT Patent application PCT/US99/28930, published November 2)) as WO 00/65461, introduced the Transflective Pad, a hand-held half-silvered mirror that was employed in combination with a table-like rear-projection device. The 6DOF (degrees-of-freedom) tracked mirror supported an interactive extension of the limited viewing volume which is provided by such semi-immersive projection devices. It was used, for instance, to view stereoscopically projected volumetric data on a Virtual Table (Wohlfahrter, Encarnacāo & Schmalstieg, 2000).

Bimber, Encarnacāo & Schmalstieg (2000b), PCT patent application PCT/US99/28930 later extended the concept of the Transflective Pad towards Augmented Reality. In this case, the Transflective Pad was applied as an interactive image plane that folded the viewer's optical path and merged the reflected graphics with the transmitted image of the real world. Consequently, it represented a possible solution to the occlusion problem that is related to rear-projection systems. The core idea of the Transflective Pad will serve as basis for the optical extension that is described in this article. It is thus an object of the invention to provide improved virtual reality systems.

SUMMARY OF THE INVENTION

The object of the invention is attained in the first instance with a virtual environment system that includes apparatus for producing a virtual environment on a projection plane, a planar mirror, and a tracker that tracks the position and orientation of the eyes of a user of the virtual environment system. The planar mirror is of substantial size relative to the projection plane and is positioned relative to the projection plane such that the plane of the mirror intersects the projection plane and the angle of the mirror relative to the projection plane is such that a user of the system who looks at the mirror sees the projection plane reflected. The apparatus for producing the virtual environment receiving a current position of the mirror and producing a first virtual environment on the projection plane when the tracker indicates that the user is looking at the mirror and a second virtual environment on the projection plane when the tracker indicates that the user is looking at the projection plane.

The first virtual environment may be coherent with the second virtual environment or independent of it. In either case, a user may move a virtual object between the first and second virtual environments. When the two virtual environments are coherent, the mirror divides a space having a single global coordinate system which the apparatus for producing the virtual environment employs to produce the virtual environment. In this situation, the apparatus for producing the virtual environment may respond when the user looks at the mirror by producing a first virtual environment which is a view of the portion of the virtual environment which is behind the mirror in the global coordinate system as it would be seen from the direction and point of view of the user if the mirror were transparent and the user were looking through the mirror into the global coordinate system. When the two virtual environments are not coherent, the second virtual environment may function as a magic lens. It may also provide a view of another group that is using a similar virtual environment system.

The mirror may be transflective and there may be a real object which has a location in the global coordinate system on the other side of the system and is visible through the mirror when the object is illuminated. In this situation, the apparatus for producing a virtual environment produces a first virtual environment that augments the real object when the user looks at the mirror. When the virtual reality system is operating in this fashion, it may be used to see how a virtual object interacts with a real object.

Other objects and advantages will be apparent to those skilled in the arts to which the invention pertains upon perusal of the following Detailed Description and drawing, wherein:

BRIEF DESCRIPTION OF THE DRAWING

FIG. 4: A virtual object is pushed through the mirror with.

Figure 1:
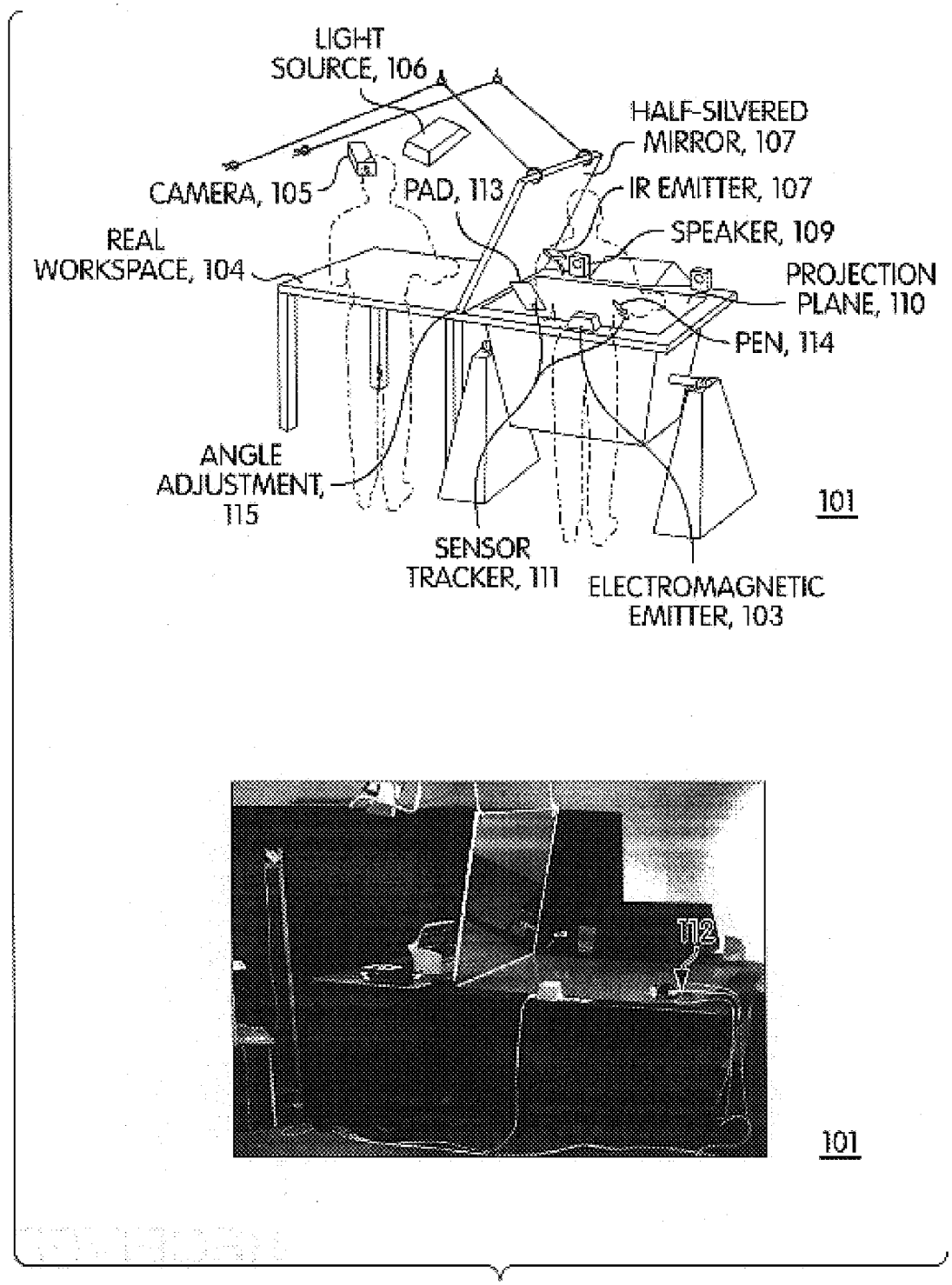
FIG. 1: Conceptual sketch and photograph of the xVT prototype

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION

The following description begins with the relevant disclosure from PCT/US99/28930 and will then describe how the extended virtual table is built and how it is used in conjunction with a table-like projection system from both, a physical and a conceptual point of view. The discussion of the extended virtual table begins with the section titled Physical arrangement of the extended virtual table.

Figure 13:
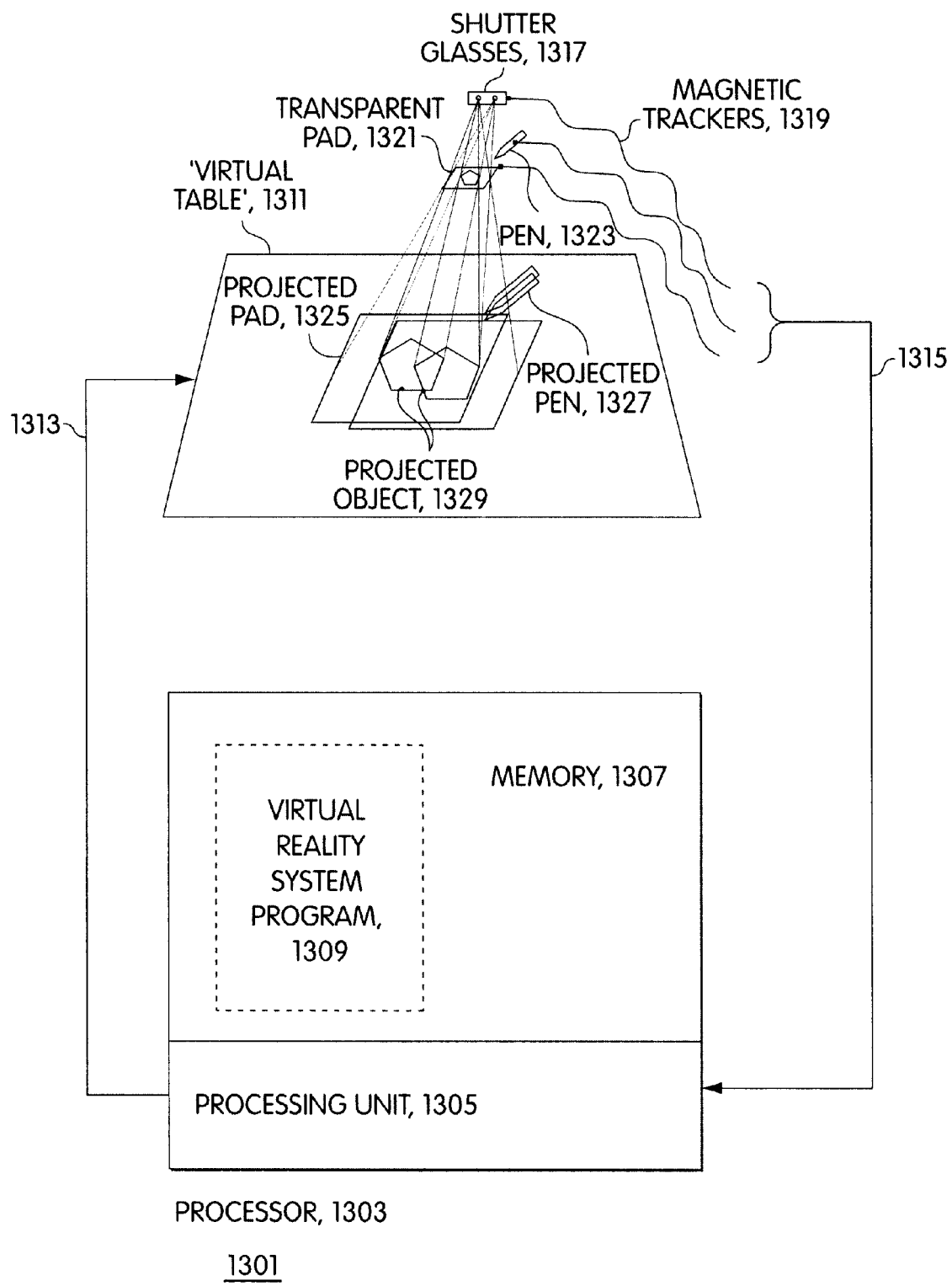
FIG. 13: Overview of an implementation of the invention in a virtual table.

Overview of the Virtual Table: FIG. 13

FIG. 13 shows a system 1301 for creating a virtual environment on a virtual table 1311. Processor 1303 is executing a virtual reality system program 1309 that creates stereoscopic images of a virtual environment. The stereoscopic images are back-projected onto virtual table 1311. As is typical of such systems, a user of virtual table 1311 views the images through LCD shutter glasses 1317. When so viewed, the images appear to the user as a three-dimensional virtual environment. Shutter glasses 1321 have a magnetic tracker attached to them which tracks the position and orientation of the shutter glasses, and by that means, the position and orientation of the user's eyes. Any other kind of 6DOF tracker could be used as well. The position and orientation are input (1315) to processing unit 1305 and virtual reality system program 1309 uses the position and orientation information to determine the point of view and viewing direction from which the user is viewing the virtual environment. It then uses the point of view and viewing direction to produce stereoscopic images of the virtual reality that show the virtual reality as it would be seen from the point of view and viewing direction indicated by the position and orientation information.

Details of a Preferred Embodiment of the Virtual Table Hardware

A preferred embodiment of system 1301 uses the Baron Virtual Table produced by the Barco Group as its display device. This device offers a 53"×40" display screen built into a table surface. The display is produced by a Indigo2™ Maximum Impact workstation manufactured by Silicon Graphics, Incorporated. When the display is viewed through CrystalEyes® shutter glasses from StereoGraphics Corporation, the result is a virtual environment of very high brightness and contrast. The shutter glasses in the preferred embodiment are equipped with 6DOF (six degrees of freedom) Flock of Birds® trackers made by Ascension Technology Corporation for position and orientation tracking.

Software

Software architecture: In the preferred embodiment, virtual reality system program 1309 is based on the Studierstube software framework described in D. Schmalstieg, A. Fuhrmann, Z. Szalavári, M. Gervautz: "Studierstube"—An Environment for Collaboration in Augmented Reality. Extended abstract appeared Proc. of Collaborative Virtual Environments '96, Nottingham, UK, Sep. 19–20, 1996. Full paper in: Virtual Reality—Systems, Development and Applications, Vol. 3, No. 1, pp. 37–49, 1998. Studierstube is realized as a collection of C++ classes that extend the Open Inventor toolkit, described at P. Strauss and R. Carey: An Object Oriented 3D Graphics Toolkit. Proceedings of SIGGRAPH'92, (2):341–347, 1992. Open Inventor's rich graphical environment approach allows rapid prototyping of new interaction styles, typically in the form of Open Inventor node kits. Tracker data is delivered to the application via an engine class, which forks a lightweight thread to decouple graphics and I/O. Off-axis stereo rendering on the VT is performed by a special custom viewer class. Studierstube extends Open Inventor's event system to process 3D (i.e., true 6DOF) events, which is necessary for choreographing complex 3D interactions like the ones described in this paper. The .iv file format, which includes our custom classes, allows convenient scripting of most of an application's properties, in particular the scene's geometry. Consequently very little application-specific C++ code—mostly in the form of event callbacks—was necessary.

Calibration. Any system using augmented props requires careful calibration of the trackers to achieve sufficiently precise alignment of real and virtual world, so the user's illusion of augmentation is not destroyed With the VT this is especially problematic, as it contains metallic parts that interfere with the magnetic field measured by the trackers. To address this problem, we have adopted an approach similar to the one described in M. Agrawala, A. Beers, B. Fröhlich, P. Hanrahan, I. McDowall, M. Bolas: The Two-User Responsive Workbench: Support for Collaboration Through Individual Views of a Shared Space. Proceedings of SIGGRAPH, 1997, and in W. Krüger, C. Bohn, B. Fröhlich, H. Schüth, W. Strauss, and G. Wesche: The Responsive Workbench: A Viruual Work Environment. IEEE Computer, 28(7):42–48, 1995. The space above the table is digitized using the tracker as a probe, with a wooden frame as a reference for correct real-world coordinates. The function represented by the set of samples is then numerically inverted and used at runtime as a look-up table to correct for systematic errors in the measurements.

Window tools: The rendering of window tools generally follows the method proposed in J. Viega, M. Conway, G. Williams, and R. Pausch: 3D Magic Lenses. In Proceedings of ACM UIST'96, pages 51–58. ACM, 1996, except that it uses hardware stencil planes. After a preparation step, rendering of the world "behind the window" is performed inside the stencil mask created in the previous step, with a clipping plane coincident with the window polygon. Before rendering of the remaining scene proceeds, the window polygon is rendered again, but only the Z-buffer is modified. This step prevents geometric primitives of the remaining scene from protruding into the window. For a more detailed explanation, see D. Schmalstieg, G. Schaufler: Sewing Virtual Worlds Together With SEAMS: A Mechanism to Construct Large Scale Virtual Environments. Technical Report TR-186-2-87-11, Vienna University of Technology, 1998.

Figure 14:
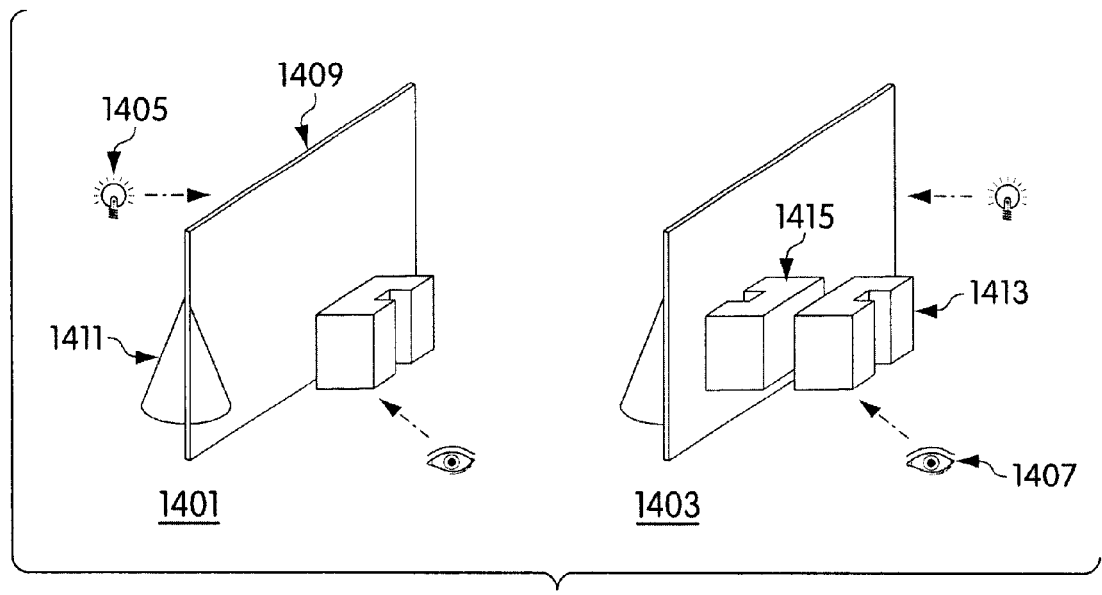
FIG. 14: Optics of the foil used in the reflective pad.
Figure 15:
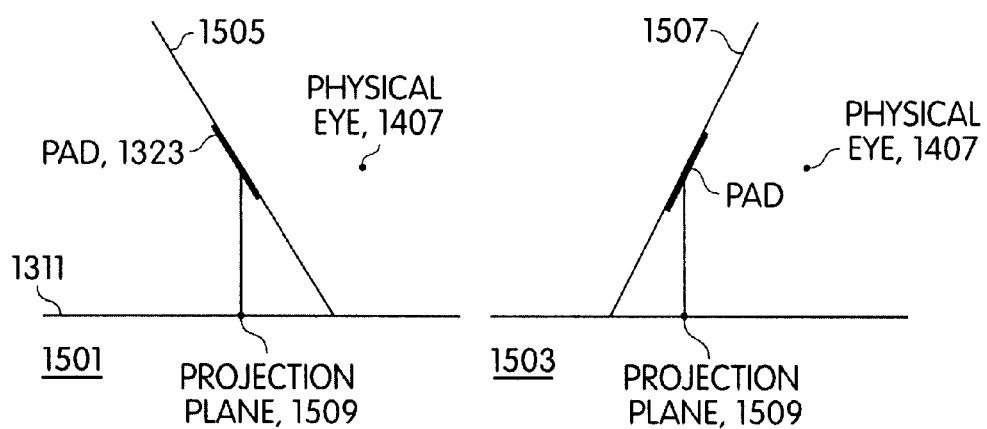
FIG. 15: The angle of the transparent pad relative to the virtual table surface determines whether it is transparent or reflective.
Figure 16:
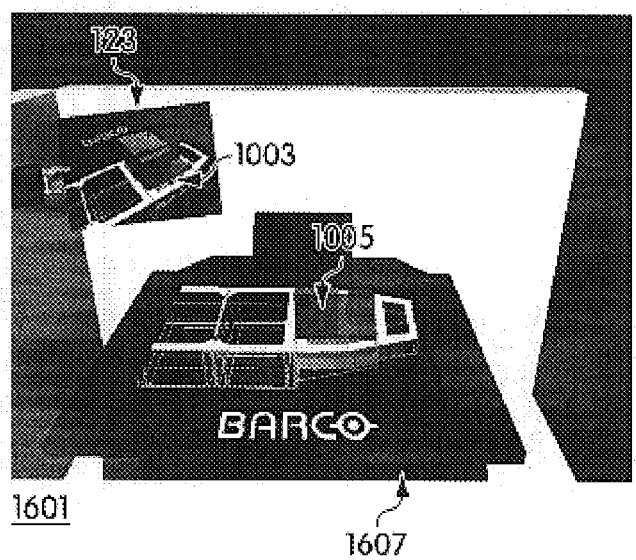
FIG. 16: The transparent pad can be used in reflective mode to examine a portion of the virtual environment that is otherwise not visible to the user.

The Mirror Tool: FIGS. 14–16

The mirror tool is a special application of a general technique for using real mirrors to view portions of a virtual environment that would otherwise not be visible to the user from the user's current viewpoint and to permit more than one user to view a portion of a virtual environment simultaneously. The general technique will be explained in detail later on.

When transparent pad 1323 is being used as a mirror tool, it is made reflective instead of transparent. One way of doing this is to use a material which can change from a transparent mode and vice-versa. Another, simpler way is to apply a special foil that is normally utilized as view protection for windows (such as Scotchtint P-18, manufactured by Minnesota Mining and Manufacturing Company) to one side of transparent pad 1323. These foils either reflect or transmit light, depending on which side of the foil the light source is on, as shown in FIG. 14. At 1401 is shown how foil 1409 is transparent when light source 1405 is behind foil 1409 relative to the position 1407 of the viewer's eye, so that the viewer sees object 1411 behind foil 1409. At 1406 is shown how foil 1409 is reflective when light source 1405 is on the same side of foil 1409 relative to position 1407 of the viewer's eye, so that the viewer sees the reflection 1415 of object 1413 in foil 1409, but does not see object 1411.

When a transparent pad 1323 with foil 1409 applied to one side is used to view a virtual environment, the light from the virtual environment is the light source. Whether transparent pad 1323 is reflective or transparent depends on the angle at which the user holds transparent pad 1323 relative to the virtual environment. How this works is shown in FIG. 15. The transparent mode is shown at 1501. There, transparent pad 1323 is held at an angle relative to the surface 1311 of the virtual table which defines plane 1505. Light from table surface 1311 which originates to the left of plane 1505 will be transmitted by pad 1323; light which originates to the right of plane 1505 will be reflected by pad 1323. The relationship between plane 1505, the user's physical eye 1407, and surface 1311 of the virtual table (the light source) is such that only light which is transmitted by pad 1323 can reach physical eye 1407; any light reflected by pad 1323 will not reach physical eye 1407. What the user sees through pad 1323 is thus the area of surface 1311 behind pad 1323.

The reflective mode is shown at 1503; here, pad 1323 defines plane 1507. As before, light from surface 1311 which originates to the left of plane 1507 will be transmitted by pad 1323; light which originates to the right of plane 1507 will be reflected. In this case, however, the angle between plane 1507, the user's physical eye 1407, and surface 1311 is such that only light from surface 1311 which is reflected by pad 1323 will reach eye 1407. Further, since pad 1323 is reflecting, physical eye 1407 will not be able to see anything behind pad 1323 in the virtual environment.

When pad 1323 is held at an angle to surface 1311 such that it reflects the light from the surface, it behaves relative to the virtual environment being produced on surface 1311 in exactly the same way as a mirror behaves relative to a real environment: if a mirror is held in the proper position relative to a real environment, one can look into the mirror to see things that are not otherwise visible from one's present point of view. This behavior 1601 relative to the virtual environment is shown in FIG. 16. Here, virtual table 1607 is displaying a virtual environment 1605 showing the framing of a self-propelled barge. Pad 1323 is held at an angle such that it operates as a mirror and at a position such that what it would reflect in a real environment would be the back side of the barge shown in virtual environment 1605. As shown at 1603, what the user sees reflected by pad 1323 is the back side of the barge.

In order to achieve the above behavior 1601, virtual reality system program 1309 tracks the position and orientation of pad 1323 and the position and orientation of shutter glasses 1317. When those positions and orientations indicate that the user is looking at pad 1323 and is holding pad 1323 at an angle relative to table surface 1311 and user eye position 1407 such that pad 1323 is behaving as a mirror, virtual reality system program 1309 determines which portion of table surface 1311 is being reflected by pad 1323 to user eye position 1407 and what part of the virtual environment would be reflected by pad 1323 if the environment was real and displays that part of the virtual environment on the portion of table surface 1311 being reflected by pad 1323. Details of how that is done will be explained later.

Of course, since what is being reflected by pad 1323 is actually being generated by virtual reality system program 1309, what is reflected may not be what would be seen in a real environment. For example, what is reflected in the mirror might be a virtual environment that shows the inside of the object being viewed with the mirror, while the rest of the virtual environment shows its outside. In this regard, pad 1323 can function in both reflective and transparent modes as a magic lens, or looked at somewhat differently, as a hand-held clipping plane that defines an area of the virtual environment which is viewed in a fashion that is different from the manner in which the rest of the virtual environment is viewed.

Details of the Mirror Tool

Scotchtint P-18 is designed not only to provide privacy, but also to protect against sunlight. This sun protection feature blocks a fraction of the transmitted light. Thus, a virtual environment that is observed through the pad appears to be darker than a virtual environment that is looked at without the pad. In the preferred environment, this problem is dealt with by setting up the virtual environment so that it includes light sources that brighten the portion of the virtual environment that is being viewed through pad 1323 and thereby overcome the effects of the foil. Other techniques for making pad 1323 reflective may not require such tactics.

Figure 9:
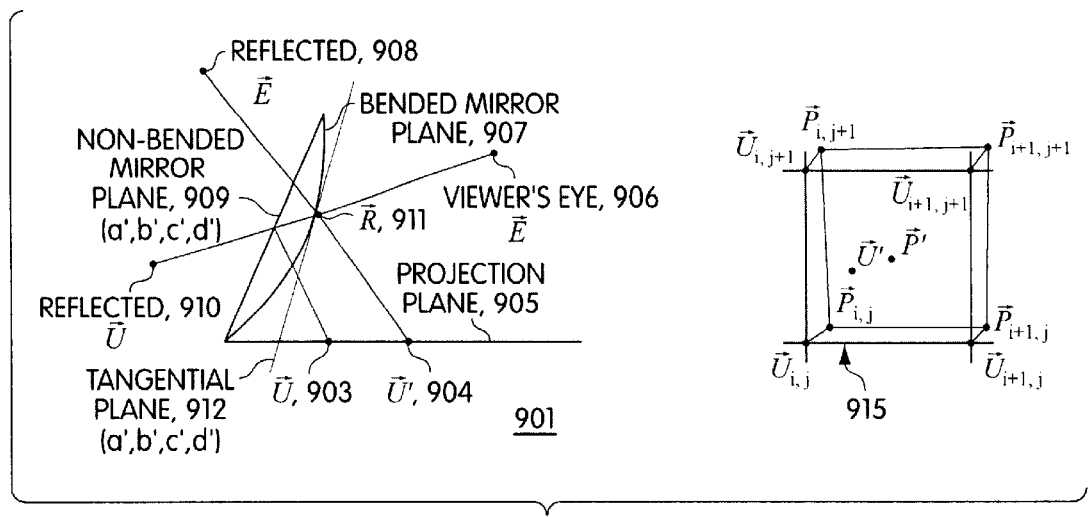
FIG. 9: Optical distortion caused by flexion Bilinear interpolation within an undistorted/predistorted grid cell.

In a preferred embodiment, virtual reality system program 1309 determines whether pad 1323 is operating in see-through or reflective mode using two terms. The first, as shown in FIG. 9, is whether the user's eye position 1407 is on the same or other side of the pad plane: If $\vec{E}$ is the user's generalized physical eye position 1407 and $\vec{P}_m$ a point on pad plane 1505 that is projected onto the projection plane at 1509, then the transparent mode is active, if $$\text{sign}(f(\vec{E})) \neq \text{sign}(f(\vec{P}_m))$$

(i.e. the points are on opposite sides of the pad plane (1501)). The reflective mode is active, if $$\text{sign}(f(\vec{E})) = \text{sign}(f(\vec{P}_m))$$

(i.e. the points 1407 and 1509 are on the same side of pad plane 1507, as shown at 1503).

This term by itself is, however insufficient. When the pad is being held so that it is perpendicular to the projection plane, small differences in the angle at which it is held will move point 1509 from one side of the pad plane to the other. In fact, however, the pad is generally being used in reflective mode when it is held in a position that is perpendicular or nearly perpendicular to the projection plane.

Figure 20:
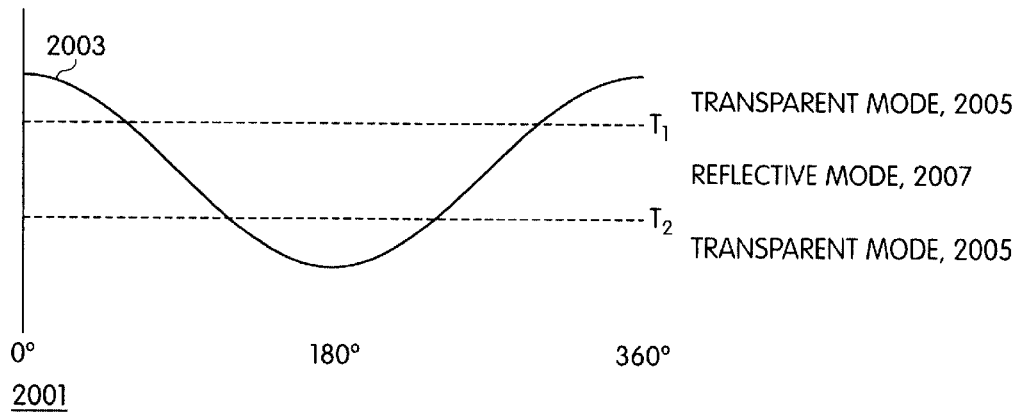
FIG. 20: A portion of the technique used to determine whether the pad is operating in transparent or reflective mode.

To deal with this problem, we also use another term which indicates whether the pad is being held in a position at which it is more perpendicular to the projection plane, in which case it is probably being used in reflective mode, or more parallel to the projection plane, in which case it is probably being used in transparent mode. We obtain this latter by assigning mode-specific function zones to the values of the solid angle between the two normal vectors of the planes. If the solid angle between $\vec{N}$ (normal vector of the pad) and $\vec{Z}$ (normal vector of the projection plane) is defined as follows:

$$c = \cos(\alpha) = \frac{\vec{N}\vec{Z}}{|\vec{N}||\vec{Z}|},$$

then c will indicate whether the pad is relatively perpendicular to or parallel to the projection plane and therefore whether the pad is being used in reflective or transparent mode. FIG. 20 shows how this is done in a preferred embodiment. Graph 2001 shows curve 2003 with the values of c for differences in the solid angles between the pad and the projection plane ranging from 0° (pad parallel to the projection surface) through 90° (pad perpendicular to the projection surface), 180° (pad again parallel), and 270° (pad again perpendicular) to 360° (pad again parallel). $T_1$ and $T_2$ are threshold values that define how the virtual environment system is to interpret the value of c. If c's value is between $T_1$ and $T_2$, the pad is in reflective mode 2007 and if it is above $T_1$ or below $T_2$, it is in transparent mode 2005. In the preferred embodiment, $T_1$ is set to 0.5 and $T_2$ to −0.5.

To determine whether the pad is in reflective or transparent mode, we combine the above two terms according to the following algorithm:

$$M = \begin{cases} \text{reflective,} & ((c < T_1) \text{ AND } (c > T_2)) \text{ OR } \left(\text{sign}(f(\vec{E})) = \text{sign}(f(\vec{P}_m))\right) \\ \text{transparent,} & ((c \geq T_1) \text{ OR } (c \leq T_2)) \text{ AND } \left(\text{sign}(f(\vec{E})) \neq \text{sign}(f(\vec{P}_m))\right) \end{cases}$$

Functions of the Reflective and Transmitting Modes in a Preferred Embodiment

Major functions of the transparent and reflective modes of operation of pad 1323 include the following:

Transparent mode: interaction (window-tools, magic-lenses, etc. as described in the foregoing)

Reflective mode: complementary navigation (difficult-to-reach viewing/interaction, clipping-plane-in-hand, etc.)

Even though the modes are complementary in most cases, a certain overlap exists. On the one hand, the two-handed interaction in combination with a tracked pen would also be supported in the reflective mode (interaction with the reflection space), and seems to be an interesting possibility to interact from "difficult-to-reach" positions (e.g. in the inside of objects, etc.). On the other hand, navigation (clipping-plane-in-hand, etc.) can also be realized in the transparent mode. Note that this is an example for an overlap of the application possibilities, but it is still complementary in the interaction range.

Beside the clipping plane defined by $f(x,y,z)+\Delta$, an additional one can be found that might be set up to support back-plane clipping from both sides of the pad plane, in both the transparent and the reflective mode. The proper one has to be activated with respect to the active mode, and the side of the pad plane the user is located at:

| Transparent mode | | Reflective mode | |
|---|---|---|---|
| $f(\vec{E}) \geq 0$ | $f(\vec{E}) < 0$ | $f(\vec{E}) \geq 0$ | $f(\vec{E}) < 0$ |
| $-f(x,y,z) - \Delta$ | $f(x,y,z) + \Delta$ | $f(x,y,z) + \Delta$ | $-f(x,y,z) - \Delta$ | interact within the current visibility scope, and objects can be reached that are not visible under other circumstances.

Furthermore, we can overload the transparent, as well as the reflective mode with a multitude of different functionality. The user can activate different modes that are supported by the two different sides of the transparent pad. Thus, for instance, window-controls (such as buttons, sliders, etc.) are offered on the one side, and through-the-plane tools (such as magic lenses, etc.) are provided on the other side. The user can switch between them at pleasure, by turning over the pad. When pad 1323 is given a reflective mode, it effectively has four sides, two in each mode, and each of these sides can have a different functionality.

Figure 17:
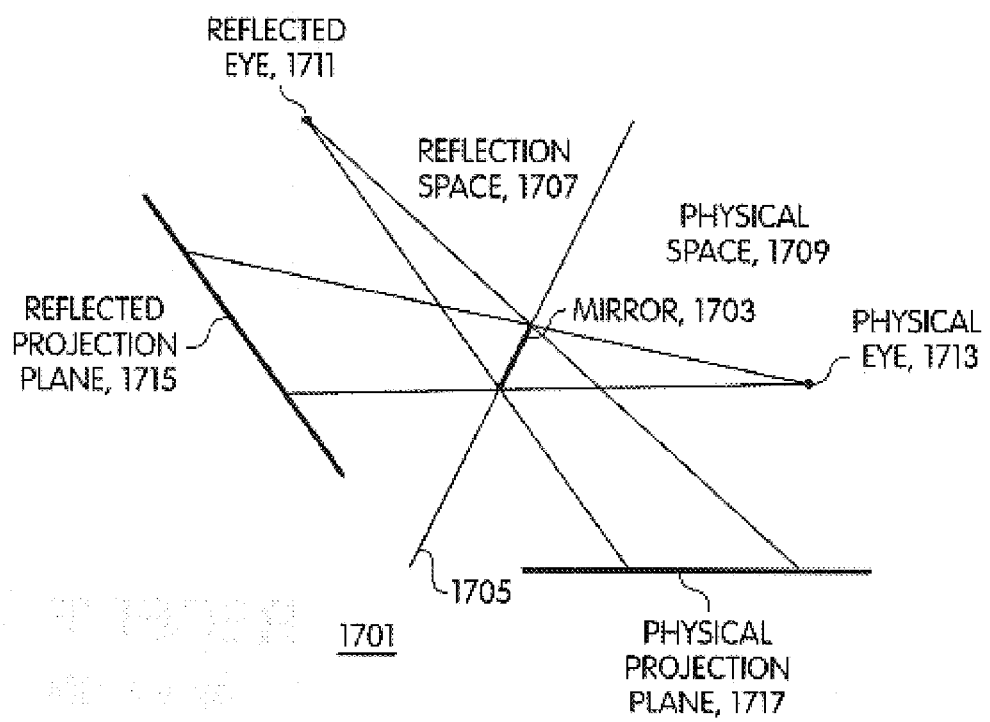
FIG. 17: How the portion of the virtual environment that is reflected in a mirror is determined.
Figure 18:
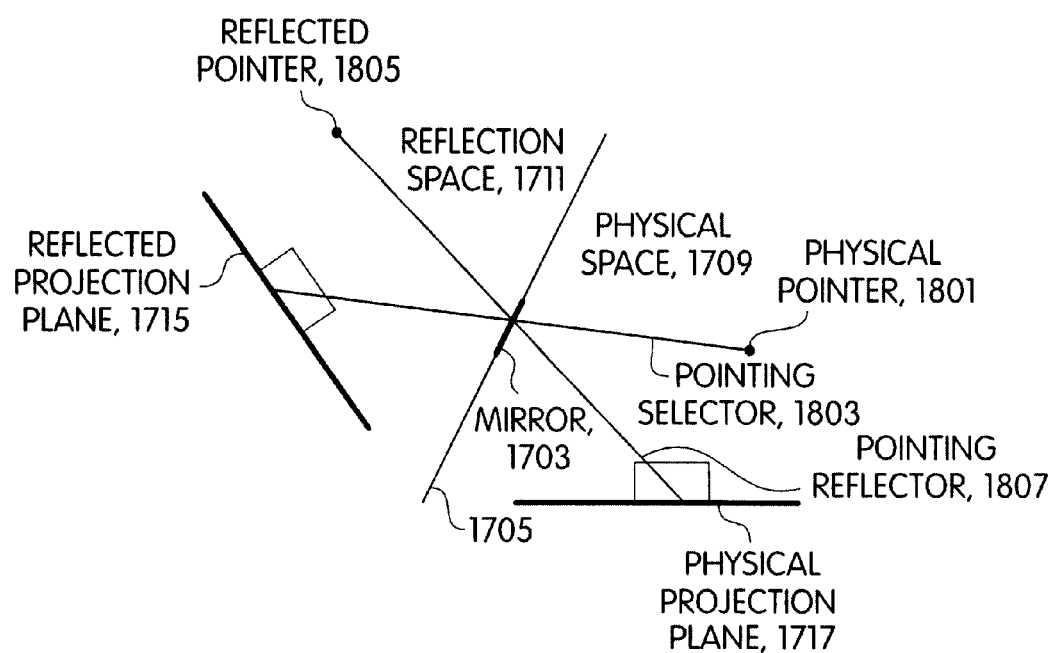
FIG. 18: How ray pointing devices may be used with a mirror to manipulate a virtual environment reflected in the mirror.

Using Real Mirrors to Reflect Virtual Environments: FIGS. 17 and 18

As indicated in the discussion of the mirror tool above, the mirror tool is a special application of a general technique for using mirrors to view virtual environments. Head tracking, as achieved for example in the preferred embodiment of system 1301 by attaching a magnetic tracker to shutter glasses 1317, represents one of the most common, and most intuitive methods for navigating within immersive or semi-immersive virtual environments. Back-screen-projection planes are widely employed in industry and the R&D community in the form of virtual tables or responsive workbenches, virtual walls or powerwalls, or even surround-screen projection systems or CAVEs. Applying head-tracking while working with such devices can, however, lead to an unnatural clipping of objects at the edges of projection plane 1311. Such clipping destroys the sense of immersion into the virtual scene and is in consequence a fundamental problem of these environments. Standard techniques for overcoming this problem include panning and scaling techniques (triggered by pinch gestures) that reduce the projected scene to a manageable size. However, these techniques do not work well when the viewpoint of the user of the virtual environment is continually changing.

To address these problems we have developed a navigation method called mirror tracking that is complementary to single-user head tracking. The method employs a planar mirror to reflect the virtual environment and can be used to increase the perceived viewing volume of the virtual environment and to permit multiple observers to simultaneously gain a perspectively correct impression of the virtual environment The method is based on the fact that a planar mirror enables us to perceive the reflection of stereoscopically projected virtual scenes three-dimensionally. Instead of computing the stereo images that are projected onto surface 1311 on the basis of the positions of the user's physical eyes (as it is usually done for head tracking), the stereo images that are projected onto the portion of surface 1311 that is reflected in the planar mirror must be computed on the basis of the positions of the reflection of the user's eyes in the reflection space (i.e. the space behind the mirror plane). Because of the symmetry between the real world and its reflected image, the physical eyes perceive the same perspective by looking from the physical space through the mirror plane into the reflection space, as the reflected eyes do by looking from the reflection space through the mirror plane into the physical space. This is shown at 1701 in FIG. 17. Mirror 1703 defines a plane 1705 which divides what a user's physical eye 1713 sees into two spaces: physical space 1709, to which physical eye 1713 and physical projection plane 1717 belong, and reflection space 1707, to which reflection 1711 of physical eye 1713 and reflection 1715 of physical projection plane 1717 appear to belong when reflected in mirror 1703. Because reflection space 1707 and physical space 1709 are symmetrical, the portion of the virtual environment that physical eye 1713 sees in mirror 1703 is the portion of the virtual environment that reflected eye 1711 would see if it were looking through mirror 1703.

Thus, in order to determine the portion of physical projection plane 1717 that will be reflected to physical eye 1713 in mirror 1703 and the point of view from which physical eye 1713 will see the virtual reality projected on that portion of physical projection plane 1716, virtual reality system program 1309 need only know the position and orientation of physical eye 1713 and the size and position of mirror 1703. Using this information, virtual reality system program 1309 can determine the position and orientation of reflected eye 1711 in reflected space 1707 and from that, the portion of physical projection plane 1717 that will be reflected and the point of view which determines the virtual environment to be produced on that portion of physical projection plane 1717.

If mirror plane 1705 is represented as:

$f(x,y,z) = ax + by + cz + d = 0$, with its normal vector $\vec{N}$=[a,b,c] then the reflection of a point (in physical space coordinates) can be calculated as follows:

$$\vec{P}' = \vec{P} - \frac{2}{(\vec{N}^2)}(\vec{N}\vec{P}+d)\vec{N},$$

where $\vec{P}$ is the physical point and $\vec{P}'$ its reflection. To make use of the binocular parallax, the reflections of both eyes have to be determined. In contrast to head tracking, the positions of the reflected eyes are used to compute the stereo images, rather than the physical eyes.

We can apply the reflection theorem to compute a vector's reflector:

$$\vec{L}'=2(\vec{N}\vec{L})\vec{N}-\vec{L},$$

where $\vec{L}'$ is the reflector of $\vec{L}$.

If $\vec{E}$ is the user's generalized physical eye position and $\vec{X}$ a visible point on the mirror plane, then $$\vec{L} = \frac{\vec{E}-\vec{X}}{|\vec{E}-\vec{X}|}.$$

Hence, we can compute the visible points that are projected onto physical projection plane 1717 (g(x,y,z)=0) and are reflected by mirror plane 1705 (f(x,y,z)=0) as follows:

$$R=\{\vec{Y}|\vec{Y}=\vec{X}+\lambda\vec{L}', g(\vec{Y})=0, f(\vec{X})=0\},$$

where $\vec{X}$ is the point on the mirror plane that is visible to the user, and $\vec{Y}$ is the point on the projection plane that is reflected towards the user at $\vec{X}$.

Uses of Mirrors in Viewing Virtual Environments

We have already seen how transparent pad 1323 may be made reflective and may be used in its reflective mode to view a virtual environment in the manner just described. All that is required to use any reflective surface to view a virtual environment is that virtual reality system program 1309 know the shape, location, and orientation of the mirror and the location and orientation of physical eyes 1713 that are using the mirror to view the virtual environment.

Hand-held Mirrors

One way of using such mirrors is as hand-held mirrors. Such a hand-held mirror can be used to view the virtual reality from inspection points that are difficult to reach. Because mirror tracking permits virtual reality system program 1309 to adjust what is projected on the portion of physical projection plane 1717 that is reflected in mirror 1703 as required for both the position and orientation of mirror 1703 and the position and orientation of physical eye 1713, mirror tracking allows us to observe unnaturally clipped areas intuitively, even when the observer's viewpoint is changing continuously. The mirror itself can also be used as clipping plane that enables us to investigate the interiors of objects:

f(x,y,z)+Δ, where Δ is the clipping plane offset. The offset is particularly useful to reflect the intersection in the mirror. Mirror tracking and head tracking are complementary. To switch from head tracking to mirror tracking, all the user need to is look at a mirror that is in a position where what the user will see in the mirror is a reflection of a portion of projection plane 1717. If the user is holding the mirror, the user can manipulate it until it is in the proper position. To return to head tracking, all the user has to do is cease looking into the mirror. If the mirror is hand-held, the user can simply lay it down.

Using Mirrors to Permit Group Observations of a Virtual Environment

By presuming that the physical and the reflected eyes are always located at constant positions and orientations relative to mirror plane 1705 (e.g. on the mirror plane), we can do mirror tracking simply by tracking the mirror. Even though this approximation does not result in a mirrored perspective that is absolutely correct for each observer viewing the mirror, it does allow multiple observers to view the virtual environment simultaneously by means of the mirror. By moving the mirror, different portions of the virtual environment may be displayed to all of those looking at the mirror. The perspective seen by the observers can be thought of as the perspective two stereo-cameras would capture from eye positions that are kept constant relative to the mirror-plane. Everyone looking at the mirror can then observe this perspective.

Of course, only observers whose eye positions matched the constant eye positions would perceive an undistorted stereoscopic impression. We found, however, that a satisfactory stereoscopic impression can still be perceived by viewers who take up obtuse-angled lines of vision with regard to relatively small mirrors.

Techniques that compute the best average viewpoint for a group of people create similar problems. The closer a single observer is to the average viewpoint, the less distorted is his view; the more compact the group is clustered, the lower the stereoscopic and perspective error for every single observer.

The following observations can be made concerning using mirrors to enable a group of observers to view a virtual environment:

The perspective of the image that is visible in the mirror is always approximately correct for all observers, since it depends only on the mirror (camera-display paradigm) and not on a single user.

Relatively small mirrors force the observers to cluster together, in order to look simultaneously at the mirror-plane. This keeps the individual stereoscopic error low.

Coordination problems that arise out of simultaneous navigation with the whole group are handled by reorienting the mirror, instead of the moving the group. This keeps the group clustered and the individual stereoscopic error remains low.

Navigation control can be intuitively delegated to another person by simply handing over the mirror.

As it is the case for single users, mirror-tracking also enables a group to increase its viewing volume in the environment.

Interacting with Reflection Space 1707

Our mirror-interaction paradigm supports indirect manipulative metaphors using ray pointers (e.g. ray casting, gaze-directed interaction and pointing). The location and orientation of such pointing devices are provided to system 1309,. As shown in FIG. 18, pointing selector 1803 produced by physical pointer 1801 must be directed at the location of interest in the reflection in mirror 1703. System 1309 computes the location and orientation in reflection space 1711 of a reflected pointer 1805 and from that, pointing reflector 1807. The location in physical projection plane 1717 specified by pointing reflector 1807 is the selected location. FIG. 18 shows the geometric and computational basis for all ray-pointing interactions with reflection space 1711. Note that direct manipulation (such as virtual hands, direct picking) of the reflections is not possible because of the physical constraints of mirror 1703.

Figure 21:
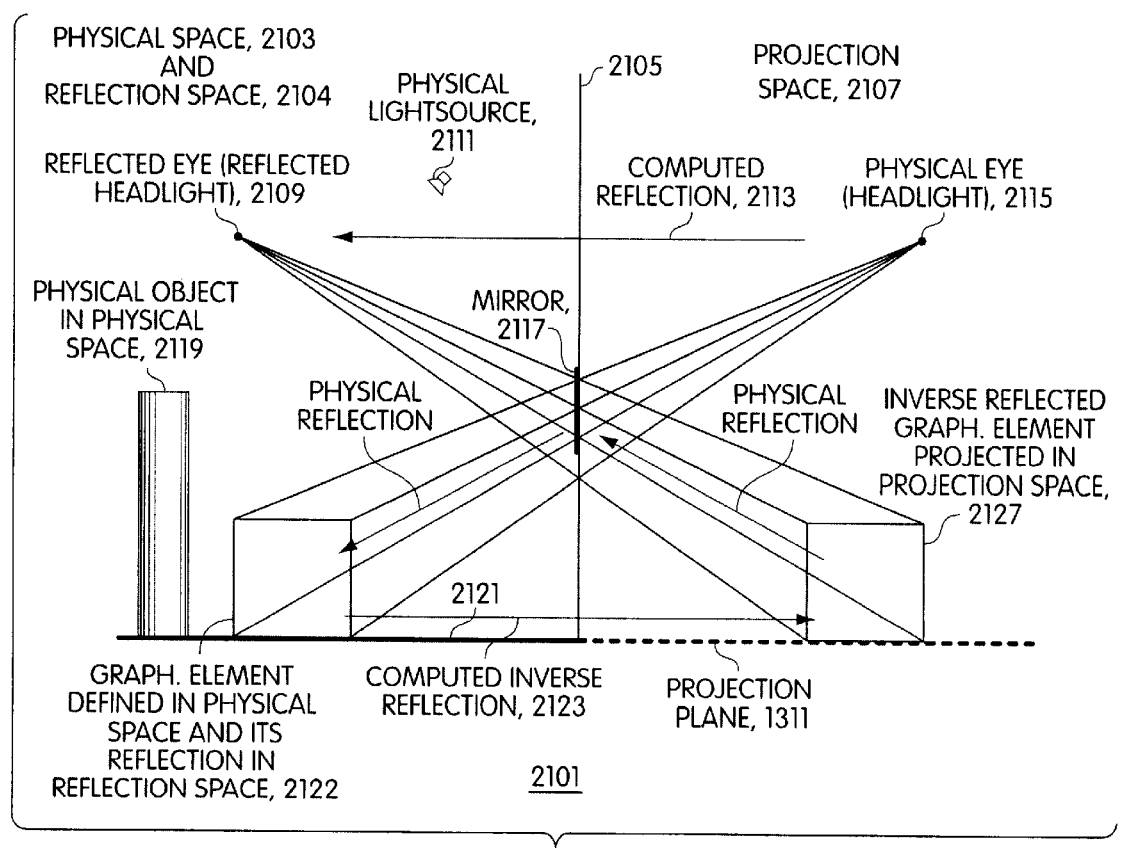
FIG. 21: A transflective panel may be used with a virtual environment to produce reflections of virtual objects that appear to belong to a physical space.
Figure 22:
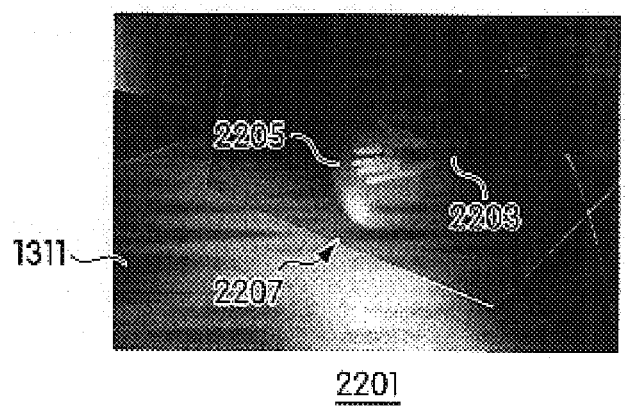
FIG. 22: How the transflective panel may be used to prevent a virtual object from being occluded by a physical object.
Figure 23:
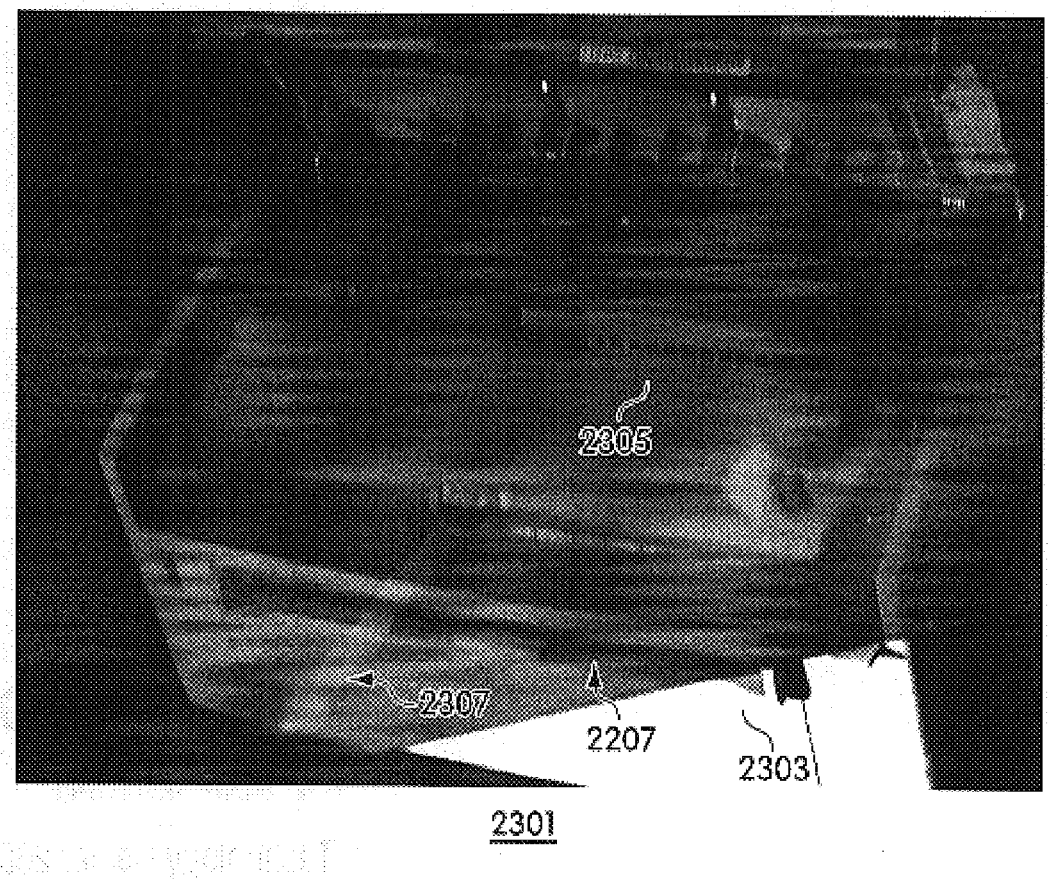
FIG. 23: How the transflective panel may be used to augment a physical object with a virtual object.

Using Transflective Tools with Virtual Environments: FIGS. 21–23

When the reflecting pad is made using a clear panel and film such as Scotchtint P-18, it is able not only to alternatively transmit light and reflect light, but also able to do both simultaneously, that is, to operate transflectively. A pad with this capability can be used to augment the image of a physical object seen through the clear panel by means of virtual objects produced on projection plane 1311 and reflected by the transflective pad. This will be described with regard to FIG. 21.

In FIG. 21, the plane of transflective pad 2117 divides environment 2101 into two subspaces. We will call subspace 2107 that contains the viewer's physical eyes 2115 and (at least a large portion of) projection plane 1311 'the projection space' (or PRS), and subspace 2103 that contains physical object 2119 and additional physical light-sources 2111 'the physical space' (or PHS). Also defined in physical space, but not actually present there, is virtual graphical element 2121. PHS 2103 is exactly overlaid by reflection space 2104, which is the space that physical eye 2115 sees reflected in mirror 2117. The objects that physical eye 2115 sees reflected in mirror 2117 are virtual objects that the virtual environment system produces on projection plane 1311. Here, the virtual environment system uses the definition of virtual graphical element 2121 to produce virtual graphical element 2127 at a location and orientation on projection plane 1311 such that when element 2127 is reflected in mirror 2117, the reflection 2122 of virtual graphical element 2127 appears in reflection space 2104 at the location of virtual graphical element 2121. Since mirror 2117 is transflective, physical eye 2115 can see both physical object 2119 through mirror 2117 and virtual graphical element 2127 reflected in mirror 2117 and consequently, reflected graphical element 2122 appears to physical eye 2115 to overlay physical object 2119.

We apply stereoscopic viewing and head-tracking to virtual graphical element 2127 projected onto projection plane 1311, thus all graphical elements (geometry, virtual light-sources, clipping-planes, normals, etc) are defined in the virtual scene. The exact overlay of physical space 2103 and reflection space 2104 is achieved by providing the virtual environment system with the location and orientation of physical object 2119, the definition of graphical element 2121, the location and orientation of mirror 2117, and the location and direction of view of physical eye 2115. Using this information, the virtual environment system can compute projection space 2107 as shown by arrows 2113 and 2123. The virtual environment system computes the location and direction of view of reflected eye 2109 from the location and direction of view of physical eye 2115 and the location and orientation of mirror 2117 (as shown by arrow 2113). The virtual environment system computes the location of inverse reflected virtual graphical element 2127 in projection space 2107 from the location and point of view of reflected eye 2109, the location and orientation of mirror 2117, and the definition of virtual graphical element 2121, as shown by arrow 2123. In general, the definition of virtual graphical element 2121 will be relative to the position and orientation of physical object 2119. The virtual environment system then produces inverse reflected virtual graphical element 2127 on projection plane 1311, which is then reflected to physical eye 2115 by mirror 2117. Since reflection space 2104 exactly overlays physical space 2103, the reflection 2122 of virtual graphical element 2127 exactly overlays defined graphical element 2121 In a preferred embodiment, physical object 2119 has a tracking device and a spoken command is used to indicate to the virtual environment system that the current location and orientation of physical object 2119 are to be registered in the coordinate system of the virtual environment being projected onto projection plane 1311. Since graphical element 2121 is defined relative to physical object 2119, registration of physical object 2119 also defines the location and orientation of graphical element 2121. In other embodiments, of course, physical object 2119 may be continually tracked.

The technique described above can be used to augment a physical object 2119 in PHS 2103 with additional graphical elements 2127 that are produced on projection plane 1311 and reflected in transflective mirror 2117 so that they appear to physical eye 2115 to be in the neighborhood of physical object 2119, as shown at 2121. Transflective mirror 2117 thus solves an important problem of back-projection environments, namely that the presence of physical objects in PRS 2107 occludes the virtual environment produced on projection plane 1311 and thereby destroys the stereoscopic illusion. When the above technique is used, the virtual elements will always overlay the physical objects.

More precisely, if we compute (arrow 2113) the reflection of physical eye 2115 in mirror 2117 to obtain reflected eye 2109 (as well as possible virtual head-lights) and apply the inverse reflection 2123 to every virtual element 2121 that is to appear in PHS 2103, virtual element 2121 gets projected at 2127, its corresponding inverse reflected position within PRS 2107, and physically reflected back by mirror 2117 so that it appears to physical eye 2115 to be in reflection space 2104. Since, in this case, reflection space 2104 exactly overlays PHS 2103, the reflected virtual element 2127 will appear at the same position (2122) within the reflection space as virtual element 2121 would occupy within PHS 2103 if virtual element 2121 were real and PHS 2103 were being viewed by physical eye 2115 without mirror 2117.

FIG. 22 illustrates a simple first example at 2201. A virtual sphere 2205 is produced on projection plane 1311. If hand 2203 is held between the viewer's eyes and projection plane 1311, hand 2203 occludes sphere 2205. If transflective mirror 2207 is placed between hand 2203 and the viewer's eyes in the proper position, the virtual environment system will use the position of transflective mirror 2207, the original position of sphere 2205 on projection plane 1311, and the position of the viewer's eyes to produce a new virtual sphere at a position on projection plane 1311 such that when the viewer looks at transflective mirror 2207 the reflection of the new virtual sphere in mirror 2207 appears to the viewer to occupy the same position as the original virtual sphere 2205; however, since mirror 2207 is in front of hand 2203, hand 2203 cannot occlude virtual sphere 2205 and virtual sphere 2205 overlays hand 2203.

The user can intuitively adjust the ratio between transparency and the reflectivity by changing the angle between transflective mirror 2207 and projection plane 1311. While acute angles highlight the virtual augmentation, obtuse angles let the physical objects show through brighter. As for most augmented environments, a proper illumination is decisive for a good quality. The technique would of course also work with fixed transflective mirrors 2207.

FIG. 23 shows an example of how a transflective mirror might be used to augment a transmitted image. Here, physical object 2119 is a printer 2303. Printer 2303's physical cartridge has been removed. Graphical element 2123 is a virtual representation 2305 of the printer's cartridge which is produced on projection plane 1311 and reflected in transflective mirror 2207. Printer 2303 was registered in the coordinate system of the virtual environment and the virtual environment system computed reflection space 2104 as described above so that it exactly overlays physical space 2103. Thus, virtual representation 2305 appears to be inside printer 2303 when printer 2303 is viewed through transflective mirror 2207. Because virtual representation 2305 is generated on projection plane 1311 according to the positions of printer 2303, physical eye 2115, and mirror 2117, mirror 2117 can be moved by the user and the virtual cartridge will always appear inside printer 2303. Virtual arrow 2307, which shows the direction in which the printer's cartridge must be moved to remove it from printer 2303 is another example of augmentation. Like the virtual cartridge, it is produced on projection plane 1311. Of course, with this technique, anything which can be produced on projection plane 1311 can be use to augment a real object.

To create reflection space 2104, the normal/inverse reflection must be applied to every aspect of graphical element 2127, including vertices, normals, clipping planes, textures, light sources, etc., as well as to the physical eye position and virtual head-lights. Since these elements are usually difficult to access, hidden below some internal data-structure (generation-functions, scene-graphs, etc.), and an iterative transformation would be too time-intensive, we can express the reflection as a 4×4 transformation matrix. Note that this complex transformation cannot be approximated with an accumulation of basic transformations (such as translation, rotation and scaling).

Let f(x,y,z)=ax+by+cz+d be the mirror-plane, with its normal $\vec{N}$=[a,b,c] and its offset d. Then the reflection matrix is:

$$M = \frac{1}{\vec{N}^2} \begin{bmatrix} b^2+c^2-a^2 & -2ab & -2ac & -2ad \\ -2ab & a^2+c^2-b^2 & -2bc & -2bd \\ -2ac & -2bc & a^2+b^2-c^2 & -2cd \\ 0 & 0 & 0 & \vec{N}^2 \end{bmatrix}$$

By applying the reflection matrix, every graphical element will be reflected with respect to the mirror-plane. A side-effect of this is, that the order of polygons will also be reversed (e.g. from counterclockwise to clockwise) which, due to the wrong front-face determination, results in a wrong rendering (e.g. lighting, culling, etc.). This can easily be solved by explicitly reversing the polygon order.

How this is done is shown in the following example in source code that uses the OpenGL graphical API. Details of this API may be found at www.opengl.org.

```
...
glFrontFace(GL_CW);   // set polygon order to clockwise
                      // (OpenGL default: counterclockwise)
glPushMatrix( );      // backup current transformation matrix
glMultMatrixd(M);     // apply reflection matrix
renderEverything( );  // render all graphical elements that have to
                      // be reflected (with respect to reflected eye
                      // position and reflected headlights)
```

-continued

```
glPopMatrix( );       // restore transformation matrix
glFrontFace(GL_CCW);  // set polygon order back to default
                      // (counterclockwise)
...
```

Any complex graphical element (normals, material properties, textures, text, clipping planes, light sources, etc.) is reflected by applying the reflection matrix, as shown in the pseudo-code above.

Figure 19:
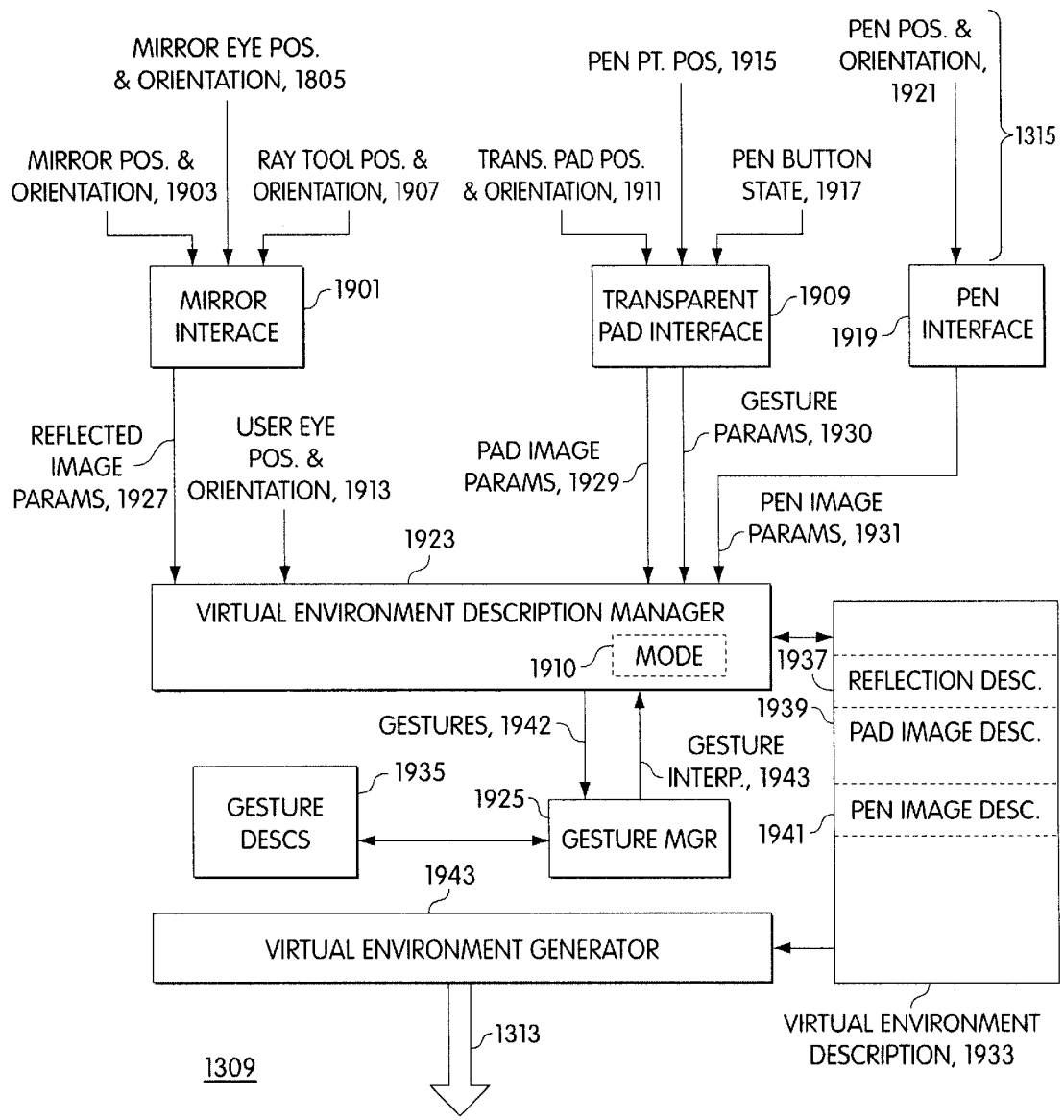
FIG. 19: Overview of virtual reality system program 109.

Overview of Virtual Reality System Program 1309: FIG. 19

Virtual reality system program 1309 in system 1301 is able to deal with inputs of the user's eye positions and locations together with position and orientation inputs from transparent pad 1323 to make pad image 1325, with position and orientation inputs from pen 1321 to make projected pen 1327, with inputs from pen 1321 as applied to pad 1323 to perform operations on the virtual environment, and together with position and orientation inputs from a mirror to operate on the virtual environment so that the mirror reflects the virtual environment appropriately for the mirror's position and orientation and the eye positions. All of these inputs are shown at 1315 of FIG. 13. As also shown at 1313 in FIG. 13, the resulting virtual environment is output to virtual table 1311.

FIG. 19 provides an overview of major components of program 1309 and their interaction with each other. The information needed to produce a virtual environment is contained in virtual environment description 1933 in memory 1307. To produce the virtual environment on virtual table 1311, virtual environment generator 1943 reads data from virtual environment description 1933 and makes stereoscopic images from it. Those images are output via 1313 for back projection on table surface 1311. Pad image 1325 and pen image 1327 are part of the virtual environment, as is the portion of the virtual environment reflected by the mirror, and consequently, virtual environment description 1933 contains a description of a reflection (1937), a description of the pad image (1939), and a description of the pen image (1941).

Virtual environment description 1933 is maintained by virtual environment description manager 1923 in response to parameters 1913 indicating the current position and orientation of the user's eyes, parameters 1927, 1929, 1930, and 1931 from the interfaces for the mirror (1901), the transparent pad (1909), and the pen (1919), and the current mode of operation of the mirror and/or pad and pen, as indicated in mode specifier 1910. Mirror interface 1901 receives mirror position and orientation information 1903 from the mirror, eye position and orientation information 1805 for the mirror's viewer, and if a ray tool is being used, ray tool position and orientation information 1907. Mirror interface 1901 interprets this information to determine the parameters that virtual environment description manager 1923 requires to make the image to be reflected in the mirror appear at the proper point in the virtual environment and provides the parameters (1927) to manager 1923, which produces or modifies reflection description 1937 as required by the parameters and the current value of mode 1910. Changes in mirror position and orientation 1903 may of course also cause mirror interface 1901 to provide a parameter to which manager 1923 responds by changing the value of mode 1910.

The other interfaces work in much the same fashion. Transparent pad interface 1909 receives position and orientation information 1911 from transparent pad 1323, the position 1915 of the point of pen 1321, and the state 1917 of pen 1321's button and interprets this information to provide pad image parameters 1929 to virtual environment description manager 1923 which manager 1923 can interpret to determine the part of the virtual environment upon which pad image 1325 is to appear and the mode of appearance of pad image 1325. Where gestures are involved, the pad image parameters 1929 specify the gestures and the pen strokes that make them up. Virtual environment description manager passes the gesture and pen stroke specifications to gesture manager 1925, which uses gesture descriptions 1935 to interpret them and return the results of the interpretation to manager 1923. If transparent pad 1323 is operating in gesture learning mode, gesture manager 1925 adds descriptions of the gestures and their meanings to gesture descriptions 1935. Pen interface 1919 provides the information to manager 1923 which manager 1923 needs to make projected pen 1327.

Physical Arrangement of the Extended Virtual Table: FIG. 1

The Extended Virtual Table (xVT) prototype 101 consists of a virtual 110 and a real workbench 104 (cf. FIG. 1).

A Barco BARON (2000*a*) 110 serves as display device that projects 54"×40" stereoscopic images with a resolution of 1280×1024 (or optionally 1600×1200/2) pixels on the backside of a horizontally arranged ground glass screen 110. Shutter glasses 112 such as Stereographics' CrystalEyes (StereoGraphics, Corp., 2000) or NuVision 3D's 60GX (NuVision3D Technologies, Inc. 2000) are used to separate the stereo-images for both eyes and make stereoscopic viewing possible. In addition, an electromagnetic tracking device 103/111 Ascension's Flock of Birds (Ascension Technologies. Corp., 2000) is used to support head tracking and tracking of spatial input devices (a pen 114 and a pad 115). An Onyx InfiniteReality$^2$, which renders the graphics is connected (via a TCP/IP intranet) to three additional PCs that perform speech-recognition, speech-synthesis via stereo speakers 109, gesture-recognition, and optical tracking.

A 40"×40" large, and 10 mm thick pane of glass 107 separates the virtual workbench (i.e. the Virtual Table) from the real workspace. It has been laminated with a half-silvered mirror foil 3M's Scotchtint P-18 (3M, Corp., 2000) on the side that faces the projection plane, making it behave like a front-surface mirror that reflects the displayed graphics. We have chosen a thick plate glass material (10 mm) to minimize the optical distortion caused by bending of the mirror or irregularities in the glass. The half-silvered mirror foil, which is normally applied to reduce window glare, reflects 38% and transmits 40% light. Note that this mirror extension costs less than $100. However, more expensive half-silvered mirrors with better optical characteristics could be used instead (see Edmund Industrial Optics (2000) for example).

With the bottom leaning onto the projection plane, the mirror is held by two strings which are attached to the ceiling. The length of the strings can be adjusted to change the angle between the mirror and the projection plane, or to allow an adaptation to the Virtual Table's slope 115.

A light-source 106 is adjusted in such a way that it illuminates the real workbench, but does not shine at the projection plane.

In addition, the real workbench and the walls behind it have been covered with a black awning to absorb light that otherwise would be diffused by the wall covering and would cause visual conflicts when the mirror is used in a see-through mode.

Finally, a camera 105, a Videum VO (Winnov, 2000) is applied to continuously capture a video-stream of the real workspace, supporting an optical tracking of paper-markers that are placed on top of the real workbench.

Figure 2:
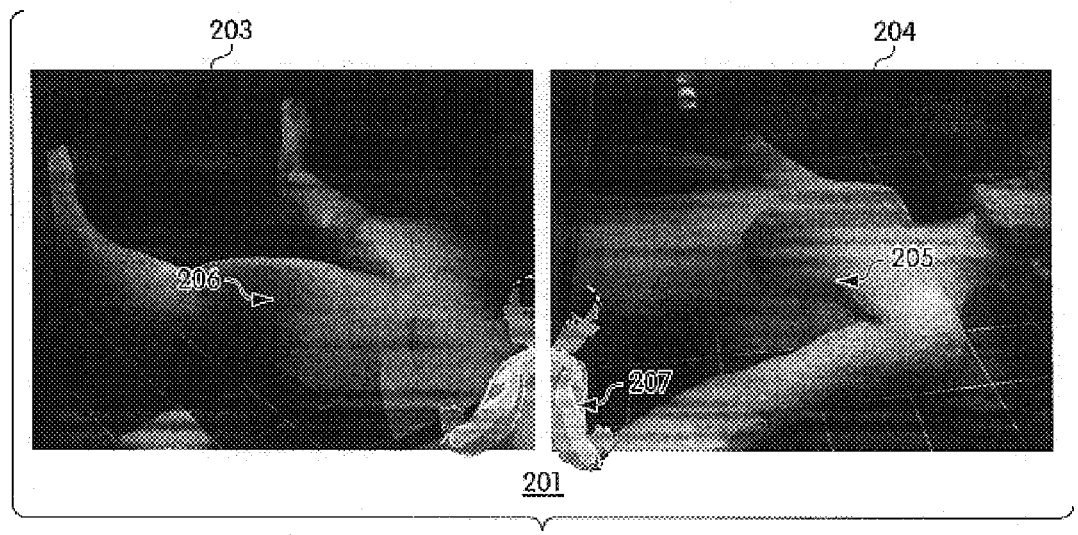
FIG. 2: A large coherent virtual content viewed in the mirror, or on the projection plane
Figure 3:
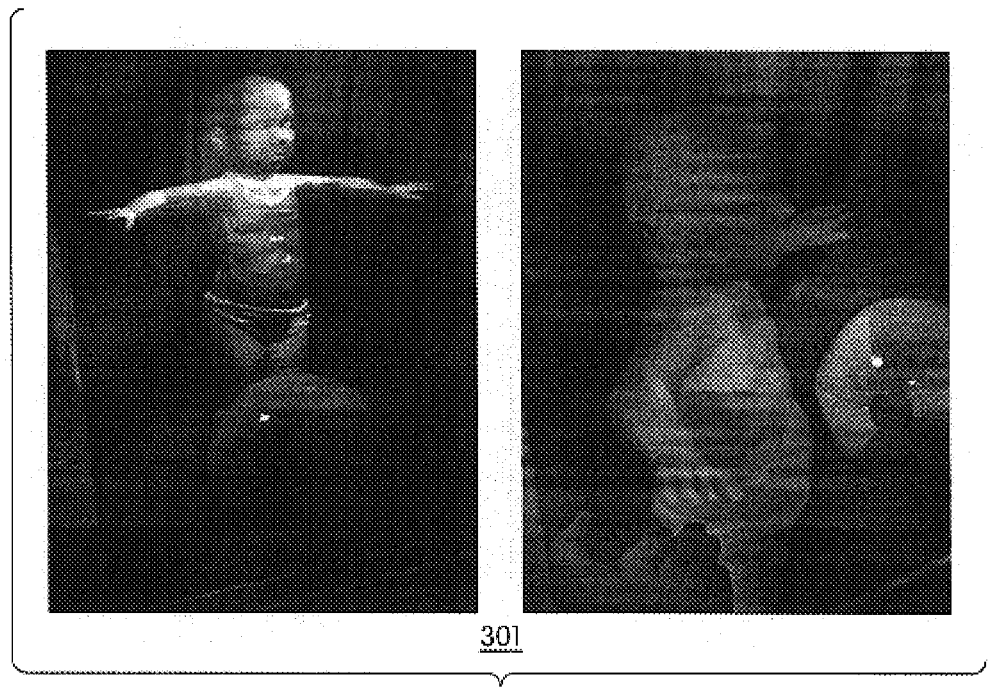
FIG. 3: Real objects behind the mirror are illuminated and augmented with virtual objects.
Figure 4:
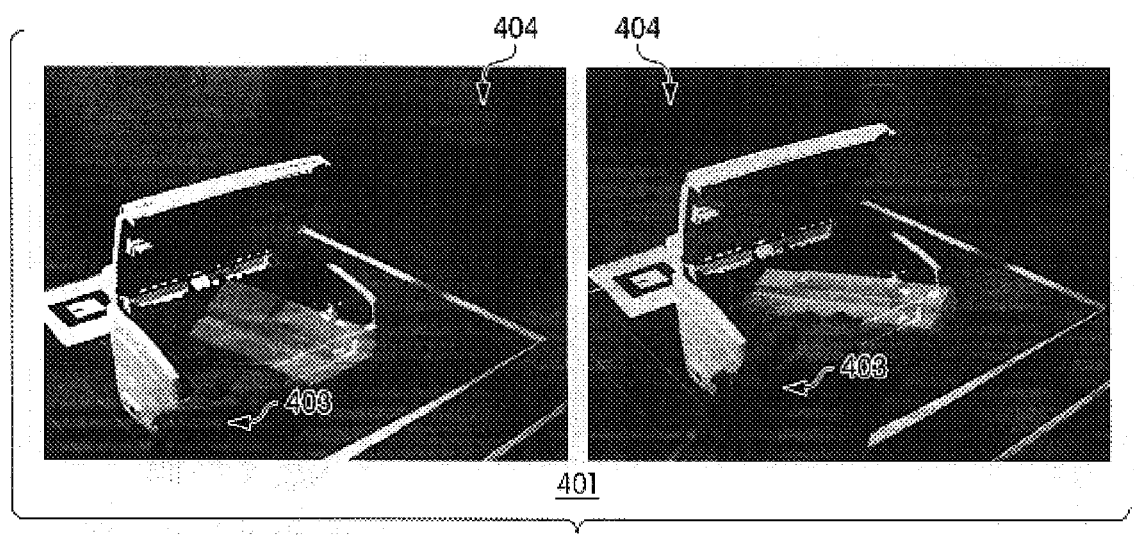

General Functioning: FIGS. 2–3

Users can either work with real objects above the real workbench, or with virtual objects above the virtual workbench.

Elements of the virtual environment, which is displayed on the projection plane, are spatially defined within a single world-coordinate system that exceeds the boundaries of the projection plane, covering also the real workspace.

The mirror plane 203 splits this virtual environment into two parts that cannot be simultaneously visible to the user. This is due to the fact that only one part can be displayed on the projection plane 204. We determine the user's viewing direction to support an intuitive visual extension of the visible virtual environment. If, on the one hand, the user is looking at the projection plane, the part of the environment 205 is displayed that is located on the user's side of the mirror (i.e. the part that is located over the virtual workbench). If, on the other hand, the user is looking at the mirror, what is displayed on projection plane 204 and reflected in the mirror is the part of the environment 206 located on the side of the mirror that is away from the user. Though that part of the environment is reflected in the mirror, it is transformed, displayed and reflected in such a way that it appears as the continuation of the other part in the mirror, i.e., the mirror appears to the user to be a window into the part of the virtual environment on the other side of the mirror.

Using the information from the head tracker, the user's viewing direction 207 is approximated by computing the single line of sight that originates at her point of view and points towards her viewing direction. The plane the user is looking at (i.e. projection plane or mirror plane) is then the one, which is first intersected by this line of sight. If the user is looking at neither plane, no intersection can be determined and nothing needs to be rendered at all.

In case the user is looking at the mirror, the part of the virtual environment behind the mirror has to be transformed in such a way that, if displayed and reflected, it appears stereoscopically and perspectively correct at the right place behind the mirror. As with the hand-held transflective pad described in (Bimber, Encarnação & Schmalstieg, 2000*b*, PCT patent application PCT/US99/28930), we use an affine transformation matrix to reflect the user's viewpoint (i.e. both eye positions that are required to render the stereo-images), and to inversely reflect the virtual environment over the mirror plane.

If we inversely reflect the graphical content from the side of the mirror away from the user and render it from the viewpoint that is reflected vice versa, the projected virtual environment will not appear as reflection in the mirror. The user rather sees the same scene that she would perceive without the mirror if the projection plane were large enough to visualize the entire environment. This is due to the neutralization of the computed inverse reflection by the physical reflection of the mirror.

Note that the transformation matrix can simply be added to a matrix stack or integrated into a scene graph without increasing the computational rendering cost, but since its application reverses also the polygon order (which might be important for correct front-face determination, lighting, culling, etc.), appropriate steps have to be taken in advance (e.g., explicitly reversing the polygon order before reflecting the scene).

The plane parameters (a,b,c,d) can be determined within the world coordinate system in different ways:

The electromagnetic tracking device can be used to support a three-point calibration of the mirror plane.

The optical tracking system can be applied to recognize markers that are (temporarily or permanently) attached to the mirror.

Since the resting points of the mirror on the projection plane are known and do not change, its angle can be measured using a simple ruler.

Note that all three methods can introduce calibration errors -either caused by tracking distortion (electromagnetic or optical) or caused by human inaccuracy. Our experiments have shown that the optical method is most precise and less vulnerable to errors.

To avoid visual conflicts between the projection and its corresponding reflection—especially for areas of the virtual environment whose projections are close to the mirror—we optionally render a clipping plane that exactly matches the mirror plane (i.e. with the same plane parameters a,b,c,d). Visual conflicts arise if virtual objects spatially intersect the side of the user's viewing frustum that is adjacent to the mirror, since in this case the objects projection optically merges into its reflection in the mirror. The clipping plane culls away the part of the virtual environment that the user is not looking at (i.e. we reverse the direction of the clipping plane, depending on the viewer's viewing direction while maintaining its position). The result is a small gap between the mirror and the outer edges of the viewing frustum in which no graphics is visualized. This gap helps to differentiate between projection and reflection and, consequently, avoids visual conflicts. Yet, it does not allow virtual objects which are located over the real workbench to reach through the mirror. We can optionally activate or deactivate the clipping plane for situations where no, or minor visual conflicts between reflection and projection occur to support a seamless transition between both spaces.

If the real workspace behind the mirror beam-splitter is not illuminated 201, the mirror behaves like a full mirror and supports a non-simultaneous visual extension of an exclusively virtual environment (i.e. both parts of the environment cannot be seen at the same time). FIG. 2 shows a large coherent virtual scene whose parts can be separately observed by either looking at the mirror 203 or at the projection plane 204. In this case, what is seen is a life-size human body for medical training viewed in the mirror (left), or on the projection plane (right). The real workspace behind the mirror is not illuminated.

Note that none of the photographs shown in this article are embellished. They were taken as seen from the viewer's perspective (rendered monoscopically). However, the printouts may appear darker and with less luminance than in reality (mainly due to the camera-response).

FIG. 3 shows a simple example in which the mirror beam-splitter is used as an optical combiner. If the real workspace is illuminated, both the real and the virtual environment are visible to the user and real and virtual objects can be combined in AR-manner 301:

Left: Real objects behind the mirror (the ball) are illuminated and augmented with virtual objects (the baby). The angle between mirror and projection plane is 60°.

Right: Without attaching a clipping plane to the mirror, the baby can reach her arm through the mirror. The angle between mirror and projection plane is 80°.

Note that the ratio of intensity of the transmitted light and the reflected light depends on the angle 115 between beam-splitter and projection plane. While acute angles highlight the virtual content, obtuse angles 115 let the physical objects shine through brighter.

Interacting Through the Mirror: FIGS. 4–7

A large variety of interaction techniques have been explored for table-like projection systems. Van de Pol, Ribarsky & Hodges (1999) present a good classification and evaluation of interaction techniques for such devices.

A tracked stylus 403 is the main input device that we use. It supports direct interaction in front of the mirror and indirect interaction with objects behind the mirror. In addition, a transparent pad or tablet (which is also tracked) is used for two-handed interaction as described in (Coquillart & Wesche, 1999; Encarnacão, Bimber, Schmalstieg & Chandler, 1999; Schmnalstieg, Encarnacão & Szalavári, 1999, PCT patent application PCT/US99/28930).

Virtual objects can be exchanged between both sides of the mirror in different ways (in the see-through mode as well as in the opaque mode). For example, they can be picked with the stylus—either directly or from a distance over the virtual workbench, or indirectly over the real workbench and can then be pushed or pulled 401 through the mirror 404— either directly (cf. FIG. 4) or indirectly by using non-linear arm-extension methods, e.g. Go-Go (Poupyrev, Billinghurst, Weghorst & Ichikawa, 1996).

Figure 5:
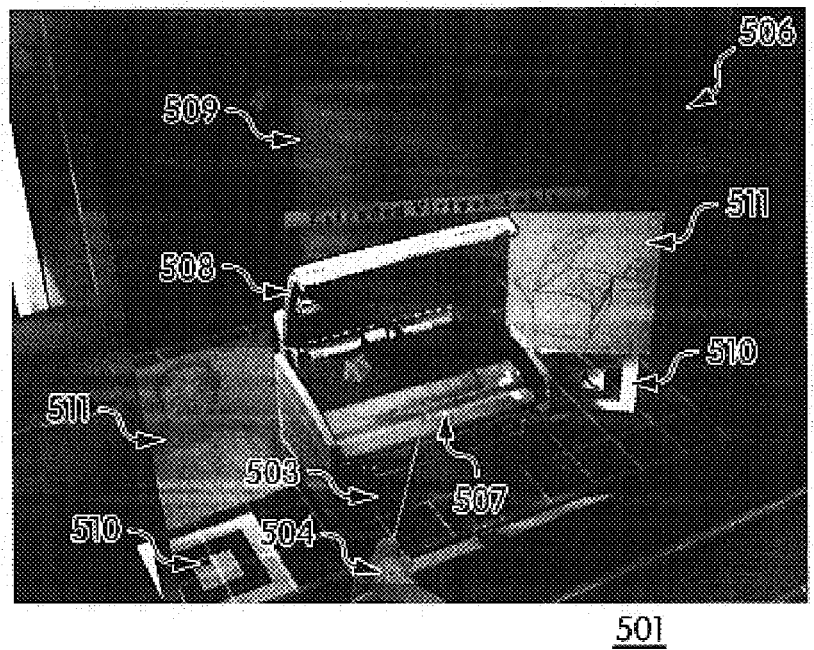
FIG. 5: Ray-casting and optical tracking within an augmented real environment

As illustrated in FIG. 5, a virtual laser beam 503 that is cast from the stylus 504 through the mirror 506 is used to select and to manipulate (i.e. to move and place) virtual objects 507 behind the mirror plane.

This ray-tool permits interaction with virtual objects on a remote basis and offers an indirect object placement by "beaming" the object back and forth along the ray.

Virtual-virtual and real-virtual object collision detection is applied over the real and the virtual workbench to simulate a realistic interaction behavior between objects. This fundamental collision detection capability enables us to implement gravity-based automatic object placement methods, as described by Breen, Whitaker, Rose & Tuceryan (1996).

Real objects 508 also can occlude virtual ones 509, as FIGS. 3 and 5 show. This is achieved by implementing a method for see-through optical combination introduced by Breen et al. (1996) and an object-based blurring technique as described by Fuhrmann, Hesina, Faure & Gervautz, (1999).

Optical tracking is applied in addition above the real workbench. A camera 105 captures a single video-stream of the real workspace and tracks movable paper makers 510 over the real workbench (Kato, Billinghurst, Blanding & May, 1999). We use the makers to track real world objects, for calibrating the setup, or—as illustrated in FIG. 5—as placeholder for multi-media information 511 (e.g., images, video or textual information).

A pointing method that is similar to the ones described by Whitaker, Crampton, Breen, Tuceryan and Rose (1995) and Fuhrman, Schmalstieg and Purgathofer (1999) is used to register stationary real objects, whose locations are needed for collision detection and occlusion.

Figure 6:
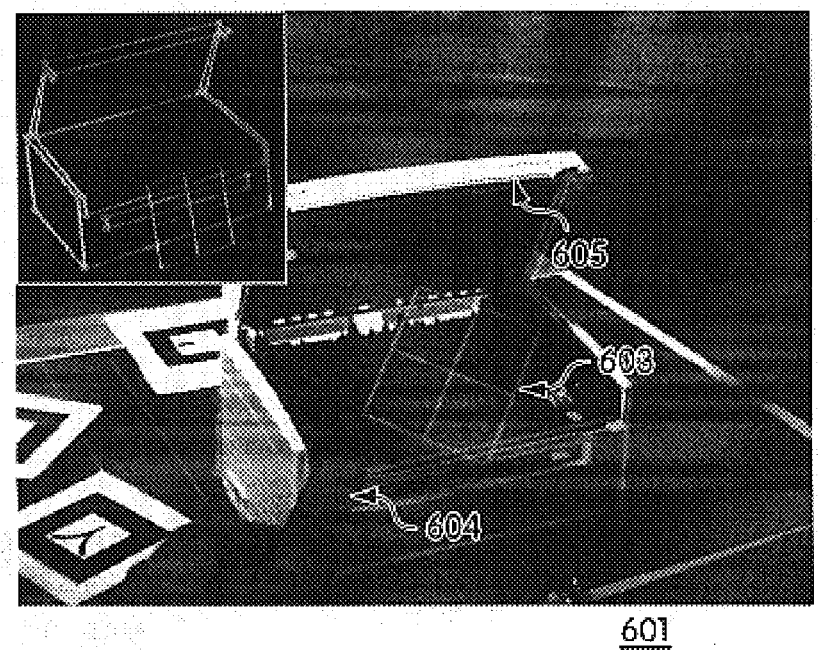
FIG. 6: Registering a real object using pointing.

A virtual cross wires 603 is attached to the stylus's 604 tip and rendered monoscopically to allow a precise adjustment of landmark points on the real object's 605 surface (as illustrated in FIG. 6). The spatial position of surface points can be determined by adjusting them with the cross wires from at least two different perspectives. The computed coordinates are used to minimize the distance function between measurements and predefined corresponding points by applying Powell's direction set method (Press, Teukolsky, Vetterling & Flannery, 1992).

The disadvantage of pointing and ray casting for indirect interaction is, that they cannot be used for directly defining spatial points. To support an immediate definition of points within the 3D free-space, we offer a remote usage of the same tools (i.e. the pen and the pad tools) that are applied directly above the virtual workbench. To allow an ergonomic usage of the remote tools 701, they can be frozen in their current position and orientation until the input devices are re-located to a more convenient posture. After unfreezing the remote tools, the new position and orientation offset is computed and used.

Sketching and drafting are examples where spatial input tools are better suited than the ray or pointing techniques.

Figure 7:
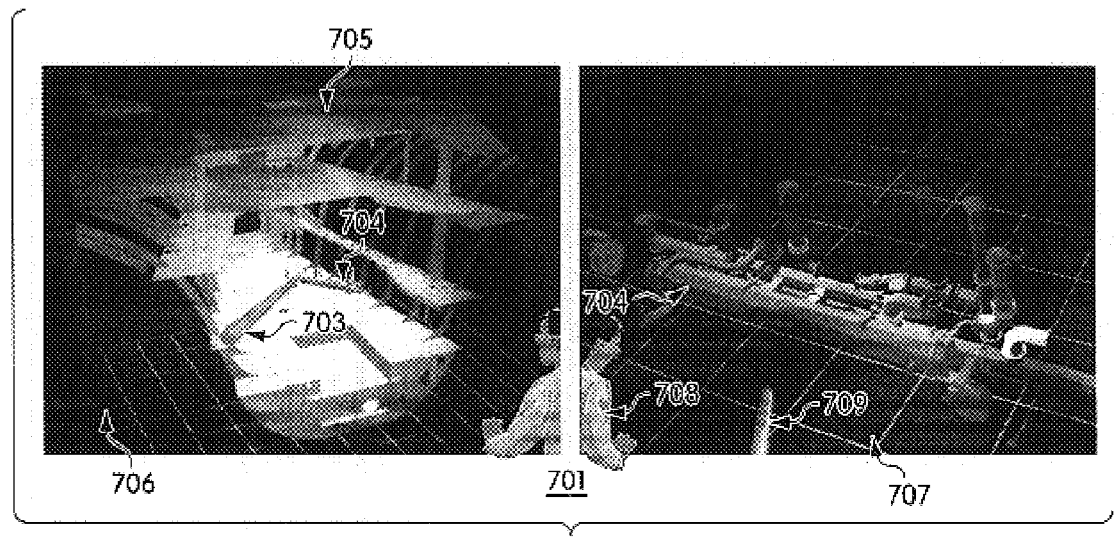
FIG. 7: Distance manipulation with remote tools behind the mirror and close manipulation above the virtual workbench with direct tools

While remote tools allow for distance manipulation, direct tools support close manipulation. FIG. 7 shows a scenario that illustrates an example for an intuitive and smooth transition between distance and close manipulation: Using the remote pen 703, distance manipulation of ship-components 704 (pipeline clusters in FIG. 7) within a ship section 705, which is visualized behind the mirror 706, is supported as long as the user 708 looks at the mirror. If the user picks a component within the ship section and then looks at the virtual workbench 707, the component is automatically transformed to fill out the entire space of the projection area at the virtual workbench. It is translated, rotated and scaled in such a way that a convenient close manipulation with the direct pen 709 tool is supported. If, however, the user picks the component above the virtual workbench and then looks at the mirror, the component is automatically transformed back to the ship section and is downscaled to fit into the ship coordinate system.

Distortion Compensation and Correction

Optical Distortion

Optical distortion is caused by the elements of an optical system. It does not affect the sharpness of a perceived image, but rather its geometry and can be corrected optically (e.g., by applying additional optical elements that physically rescind the effect of other optical elements) or computationally (e.g., by pre-distorting generated images). While optical correction may result in heavy optics and non-ergonomic devices, computational correction methods might require high computational performance.

In Augmented Reality applications, optical distortion is critical, since it prevents precise registration of virtual and real environment.

The purpose of the optics used in HMDs, for instance, is to project two equally magnified images in front of the user's eyes, in such a way that they fill out a wide field-of-view (FOV), and fall within the range of accommodation (focus). To achieve this, however, lenses are used in front of the miniature displays (or in front of mirrors that reflect the displays within see-through HMDs). The lenses, as well as the curved display surfaces of the miniature screens may introduce optical distortion which is normally corrected computationally to avoid heavy optics which would result from optical approaches.

For HMDs, the applied optics forms a centered (on-axis) optical system; consequently, pre-computation methods can be used to efficiently correct geometrical aberrations during rendering. Rolland and Hopkins (1993) describe a polygon wrapping technique as a possible correction method for HMDs. Since the optical distortion for HMDs is constant (because the applied optics is centered), a two-dimensional lookup table is pre-computed that maps projected vertices of the virtual objects' polygons to their pre-distorted location on the image plane. Note that this requires subdividing polygons that cover large areas on the image plane. Instead of pre-distorting the polygons of projected virtual objects, the projected image itself can be pre-distorted, as described by Watson and Hodges (1995), to achieve a higher rendering performance.

Correcting optical distortion is more complex for the mirror beam-splitter extension, since in contrast to HMDs, the image plane that is reflected by the mirror is not centered with respect to the optical axes of the user, but is off-axis in most cases. In fact, the alignment of the reflected image plane dynamically changes with respect to the moving viewer while the image plane itself remains at a constant spatial position in the environment. There are three main sources of optical distortion in case of the xVT: projector calibration, mirror flexion, and refraction.

Note that we correct optical distortion only while the user is working in the see-through mode (i.e. while looking through the half-silvered mirror at an illuminated real environment). For exclusive VR applications, optical distortion is not corrected—even if the mirror is used as an extension.

Figure 8:
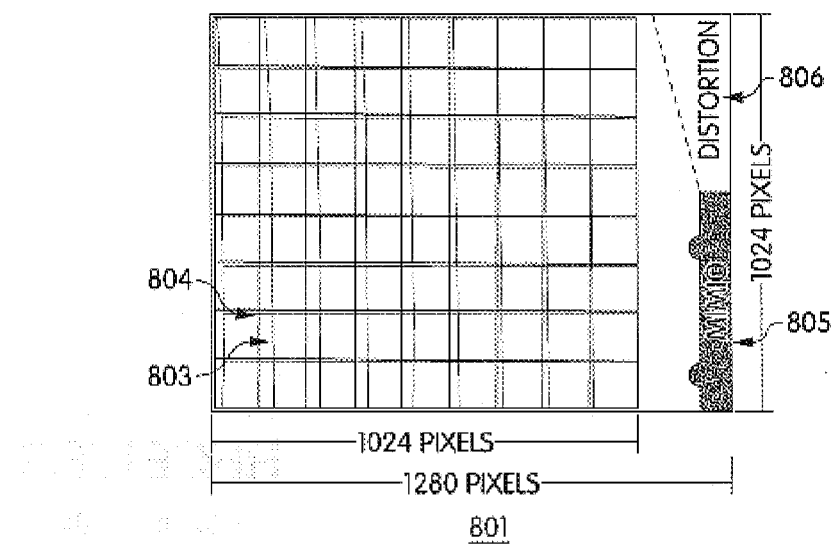
FIG. 8: Sampled distorted grid and predistorted grid after projection and re-sampling

Projector Calibration: FIG. 8

The projector that is integrated into the Virtual Table can be calibrated in such a way that it projects distorted images onto the ground glass screen. Projector-specific parameters (such as geometry, focus, and convergence) can usually be adjusted manually or automatically using camera-based calibration devices. While a precise manual calibration is very time consuming, an automatic calibration is normally imprecise and most systems do not offer a geometry calibration (only calibration routines for convergence and focus).

For exclusive VR purposes, however, we can make use of the fact, that small geometric deviations are ignored by the human-visual system. In AR scenarios, on the other hand, even slight misregistrations can be sensed.

FIG. 8 shows the calibration technique. We apply a two-pass method and render a regular planar grid 803 (U) that largely covers the projection plane. The distorted displayed grid is then sampled with a device 805 that is able measure 2D points on the tabletop. After a transformation of the sampled grid (D) into the world coordinate system, it can be used to pre-distort the projected image, since with D the geometrical deviation (U–D) which is caused by the miscalibrated projector can be expressed. A pre-distorted grid 804 (P) can then be computed with P=U+(U–D). If we project P instead of U, the pre-distortion is rescinded by the physical distortion of the projector and the visible grid appears undistorted.

To pre-distort the projected images, however, we first render the virtual environment into the frame-buffer, then map the frame-buffer's content as texture onto P (while retaining the texture indices of U and applying a bilinear texture-filter), and render P into the beforehand cleaned frame-buffer, as described by Watson and Hodges (1995) for HMDs. Note that this is done for both stereo-images at each frame.

To sample grid points, we apply a device that is usually used to track pens on a white-board—the Mimio 805 (Dunkane, Corp. 2000). The Mimio is a hybrid (ultrasonic and infrared) tracking system for planar surfaces which is more precise and less susceptible to distortion than the applied electromagnetic tracking device. As illustrated in FIG. 8, its receiver 805 has been attached to a corner of the Virtual Table (note the area where the Mimio cannot receive correct data from the sender, due to distortion—this area 806 has been specified by the manufacturer).

Since the supported maximal texture size of the used rendering package is 1024×1024 pixels, U is rendered within the area (of this size) that adjoins to the mirror. We found that 10×9 sample points for an area of 40"×40" on the projection plane is an appropriate grid resolution which avoids over-sampling but is sufficient enough to capture the distortion.

FIG. 8 illustrates the sampled distorted grid D 803 (gray), and the predistorted grid P 804 (black) after it has been rendered and re-sampled. Note that FIG. 8 shows real data from one of the calibration experiments (other experiments delivered similar results).

The calibration procedure has to be done once (or once in a while—since the distortion behavior of the projector can change over time).

Mirror Flexion: FIG. 9

For the mirror beam-splitter, a thick plate glass material has been selected to keep optical distortion caused by bending small. Due to gravity, however, a slight flexion affects the 1st order imaging properties of our system (i.e. magnification and location of the image) and consequently causes a deformation of the reflected image that cannot be avoided.

FIG. 9—left illustrates the optical distortion caused by flexion. A bent mirror does not reflect the same projected pixel for a specific line of sight as a non-bent mirror.

Correction of the resulting distortion can be realized by transforming the pixels from the position where they should be seen (reflected by an ideal non-bent mirror) to the position where they can be seen (reflected by the bent mirror) for the same line of sight.

Since a transformation of every single pixel would be inefficient, the correction of mirror flexion As can be combined using the method described above.

For every point $\vec{U}$ 903 of the undistorted grid U, the corresponding point of reflection $\vec{R}$ 911 on the bent mirror 907 has to be determined with respect to the current eye position of the viewer $\vec{E}$ 906. Note that this requires knowledge of the mirror's curved geometry. If the surface of the mirror is known, $\vec{R}$ 911 can simply be calculated by reflecting $\vec{U}$ 903 over the known (non-bent) mirror plane 907 (the reflection matrix, described by Bimber, Encarnacão & Schmalstieg, 2000b, PCT patent application PCT/US99/28930 can be used for this), and then find the intersection between the bent mirror's surface and the straight line that is spanned by $\vec{E}$ 906 and the reflection of $\vec{U}$ 910. Note that if the mirror's entire surface is not known, an interpolation between sample points (taken from the mirror's surface) can be done to find an appropriate $\vec{R}$ 911. If $\vec{R}$ 911 has been determined, the normal vector at $\vec{R}$ has to be computed (this is also possible with the known mirror-geometry). The normal vector usually differs from the normal vector (a,b,c) of the non-bent mirror (which is the same for every point on the non-bent mirror's surface). With the computed $\vec{R}$ 911 and its normal, the equation parameters (a',b',c',d') for a plane that is tangential to $\vec{R}$ 912 are identified. To compute the position where $\vec{U}$ 903 has to be moved on the projection plane to be visible for the same line of sight in the bent mirror, $\vec{E}$ has to be reflected over (a',b',c',d'). The intersection between the projection plane and the straight line that is spanned by the reflection of $\vec{E}$ 908 and $\vec{R}$ 911 is $\vec{U}'$ 904.

However, it is not sufficient to transform the undistorted grid with respect to the mirror's flexion and the observer's viewpoint only, because the projector distortion (described in 5.1.1) is not taken into account. To imply projector distortion, every $\vec{U}'$ 904 has to be pre-distorted, as described in the previous section. Since the $\vec{U}$'s normally do not match their corresponding $\vec{U}$s, and a measured distortion $\vec{D}'$ for each $\vec{U}'$ does not exist, an appropriate pre-distortion offset can be interpolated from the measured (distorted) grid D (as illustrated in FIG. 9—right). This can be done by bilinear interpolating between the corresponding points of the pre-distorted grid P that belongs to the neighboring undistorted grid points of U which form the cell 915 that encloses $\vec{U}'$ 913.

In summary, we have to compute a new pre-distorted grid P' 914 depending on the mirror's flexion R 911, the current eye-positions of the viewer $\vec{E}$ 906, and the projector distortion D. The resulting P' 914 can then be textured, as described in the previous section (for both stereo-images at each frame).

Note that finding an exact method of precisely determining the mirror's flexion belongs to our future research. Using the electromagnetic tracking-device to sample the mirror's surface turned out to be insufficient, due to the non-linear tracking distortion over the extensive area.

Figure 10:
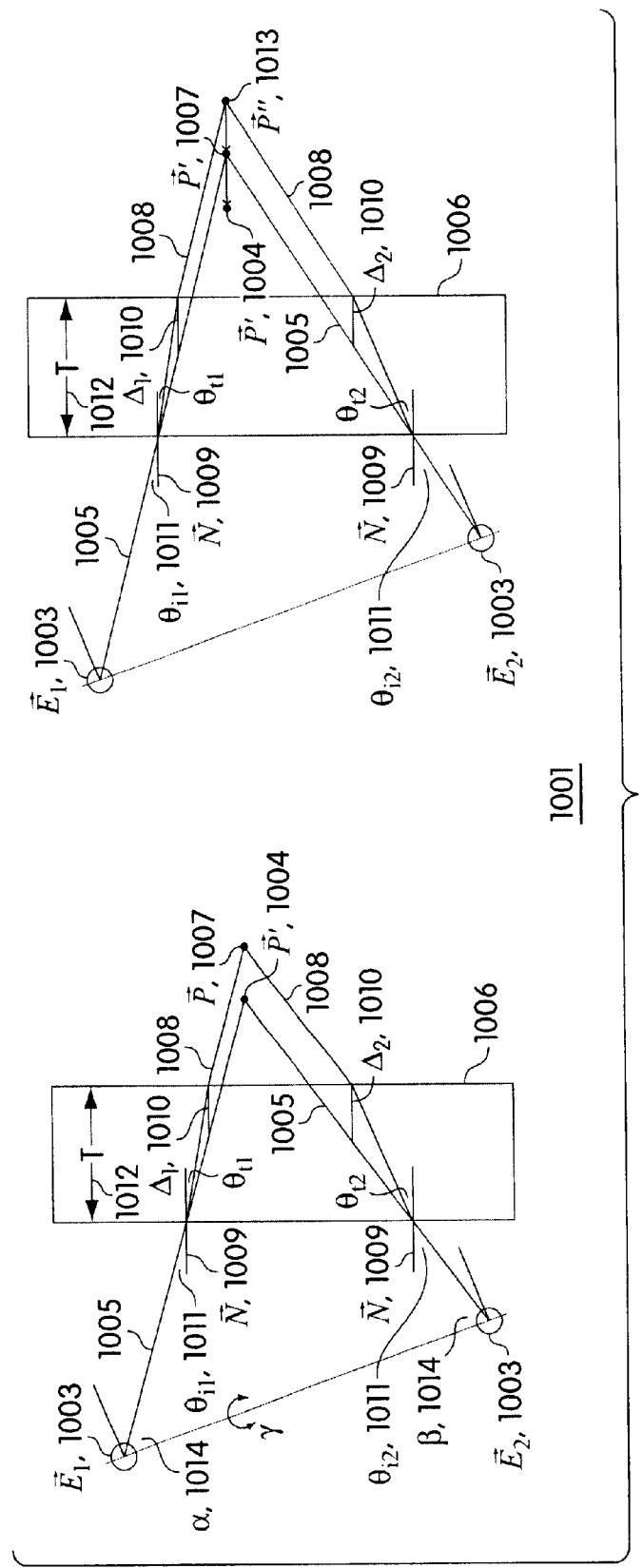
FIG. 10: Precise refraction method and refraction approximation.

Refraction: FIG. 10

On the one hand, a thick pane of glass stabilizes the mirror and consequently minimizes optical distortion caused by flexion. On the other hand, however, it causes another optical distortion which results from refraction. Since the transmitted light that is perceived through the half-silvered mirror is refracted, but the light that is reflected by the front surface mirror foil is not, the transmitted image of the real environment cannot be precisely registered to the reflected virtual environment—even if their geometry and alignment match exactly within the world coordinate system.

All optical systems that use any kind of see-through elements have to deal with similar problems. While for HMDs, aberrations caused by refraction of the lenses are mostly assumed to be static (as stated by Azuma (1997)), they can be corrected with paraxial analysis approaches. For other setups, such as the reach-in systems that were previously mentioned or our mirror extension, aberrations caused by refraction are dynamic, since the optical distortion changes with a moving viewpoint. Wiegand et al. (1999) for instance, estimated the displacement caused by refraction for their setup to be less than 1.5 mm—predominantly in +y-direction of their coordinate system. While an estimation of a constant refraction might be sufficient for their apparatus (i.e. a near-field virtual environment system with fixed viewpoint that applies a relatively thin (3 mm) half-silvered mirror), our setup requires a more precise definition, because it is not a near-field VE system but rather a mid-field VR/AR system, considers a head-tracked viewpoint, and applies a relatively thick half-silvered mirror (10 mm).

Since we cannot pre-distort the refracted transmitted image of the real world, we artificially refract the reflected virtual world instead, to make both images match.

FIG. 10 illustrates our approaches.

With reference to FIG. 10-left: The observer's eyes ($\vec{E}_1$, $\vec{E}_2$) 1003 have to converge to see a point in space ($\vec{P}'$) 1004 in such a way that the geometric lines of sight (colored in black) 1005 intersect in $\vec{P}'$ 1004. If the observer sees through a medium 1006 whose density is higher than the density of air, the geometric lines of sight are bent by the medium and she perceives the point in space ($\vec{P}$) 1007 where the resulting optical lines of sight (colored in dark gray) 1008 intersect—i.e. she perceives $\vec{P}$ 1007 instead of $\vec{P}'$ 1004 if refraction bends her geometric lines of sight 1003. To artificially refract the virtual environment, our goal is to translate every point $\vec{P}$ 1007 of the virtual environment to its corresponding point $\vec{P}'$ 1004—following the physical rules of refraction. Note that all points $\vec{P}$ 1007 are virtual points that are not physically located behind the mirror beam-splitter, and consequently are not physically refracted by the pane of glass, but are reflected by the front surface mirror. The resulting transformation is curvilinear, rather than affine, thus a simple transformation matrix cannot be applied.

Using Snell's law for refraction, we can compute the optical line of sight for a corresponding geometric line of sight 1003. Note that in case of planar plates both lines of sight are simply shifted parallel along the plate's normal vector ($\vec{N}$) 1009, by an amount ($\Delta$) 1010 that depends on the entrance angle ($\theta_i$) 1011 between the geometric line of sight and $\vec{N}$ 1009, its thickness (T) 1012, and the refraction index ($\eta$)—a material-dependent ratio that expresses the refraction behavior compared to vacuum (as an approximation to air).

The amount of translation ($\Delta$) 1010 can be computed as follows:

$$\theta_t = \sin^{-1}\left(\frac{\sin\theta_i}{\eta}\right)$$

Equation 1: Snell's law of refraction for planar plates of a higher density than air (compared to vacuum as approximation to air).

$$\Delta = T\left(1 - \frac{\tan\theta_t}{\tan\theta_i}\right),$$

with $$\lim\theta_i \to \frac{\pi}{2} \Rightarrow \Delta = T$$

and $$\lim\theta_i \to 0 \Rightarrow \Delta = T\left(1 - \frac{\sin\theta_t}{\sin\theta_i}\right) = T\left(1 - \frac{1}{\eta}\right) = \text{const.}$$

Equation 2: Refraction-dependent amount of displacement along the plate's normal vector.

With constant T (i.e. 10 mm) 1012 and constant $\eta$ (i.e. 1.5 for regular glass), the refractor of a ray which is spanned by the two points ($\vec{P}_1, \vec{P}_2$) depends on the entrance angle ($\theta_i$) 1011 and can be computed as follows (in parameter representation):

$$\vec{R} = \vec{P}_1 + \Delta\frac{\vec{N}}{|\vec{N}|} + \lambda(\vec{P}_2 - \vec{P}_1)$$

Equation 3: Refractor of a ray that is spanned by two points.

If the mirror is bent, as described above, the normal vector of the mirror plane is not constant and the corresponding normals of the points on the mirror surface that are intersected by the actual lines of sight have to be applied.

Note that the optical line of sight 1008 is the refractor that results from the geometric line of sight 1005 which is spanned by the viewer's eye ($\vec{E}$) 1003 and the point is space ($\vec{P}$) 1007 she's looking at.

In contrast to the optical distortions described in the previous sections, refraction is a spatial distortion and cannot be corrected within the image plane. Since no analytical correction methods exist, we apply a numerical minimization to precisely refract virtual objects that are located behind the mirror beam-splitter by transforming their vertices within the world coordinate system. Note that similar to Rolland's approach (Rolland & Hopkins, 1993), our method also requires subdividing large polygons of virtual objects to sufficiently express the refraction's curvilinearity. The goal is to find the coordinate $\vec{P}'$ 1004 where the virtual vertex $\vec{P}$ 1007 has to be translated in such a way that $\vec{P}$ 1007 appears spatially at the same position as it would appear as real point, observed through the half-silvered mirror—i.e. refracted. To find $\vec{P}'$ 1004, we first compute the geometric lines of sight 1005 from each eye ($\vec{E}_1, \vec{E}_2$) 1003 to $\vec{P}$ 1007. We then compute the two corresponding optical lines of sight 1008 using equation 3 and their intersection ($\vec{P}''$) 1013. During a minimization procedure (Powell's direction set method, Press et al., 1993) we minimize the distance between $\vec{P}$ 1007 and $\vec{P}'$ 1013 while continuously changing the angles 1014 $\alpha,\beta$ (simulating the eyes' side-to-side shifts and convergence) and $\gamma$ (simulating the eyes' up-and-down movements), and use them to rotate the geometric lines of side over the eyes' horizontal and vertical axes (the axes can be determined from the head-tracker). The rotated geometric lines of sight result in new optical lines of sight and consequently in a new $\vec{P}''$ 1013.

Finally, $\vec{P}'$ 1004 is the intersection of the (by some $\alpha,\beta,\gamma$) 1014 rotated geometric lines of sight 1005 where $|\vec{P} - \vec{P}''|$ is minimal (i.e. below some threshold $\epsilon$). This final state is illustrated in FIG. 10.

In summary, we have to find the geometric lines of sight 105 whose refractors (i.e. the corresponding optical lines of sight) 1008 intersect in $\vec{P}$ 1007 and then calculate the precise coordinate of $\vec{P}'$ 1004 as intersections of the determined geometric lines of sight 1005. Since $\vec{P}'$ 1004 is unknown, the resulting minimization problem is computationally expensive and cannot be solved in real-time.

To achieve a high performance on an interactive level, we implemented an approximation of the presented precise method.

With reference to FIG. 10—right: We compute the refractors of the geometric lines of sight to the vertex $\vec{P}$ 1007 and their intersection $\vec{P}''$ 1013. Since the angular difference between the unknown geometric lines of sight 1005 to the unknown $\vec{P}'$ 1004 and the geometric lines of sight to $\vec{P}''$ 1013 is small, the deviations of the corresponding refractors are also small. We approximate $\vec{P}'$ with $\vec{P}' = \vec{P} + (\vec{P} - \vec{P}'')$.

To compare the effectiveness of the outlined analytical approximation with the precise numerical method, we refracted vertices that covered the entire working volume behind the mirror beam-splitter over time (i.e. from different points of view) with both, the approximation and the precise method. The results are shown in table 1 (the minimization procedure was executed with a threshold of $\epsilon=0.01$ mm).

The spatial distance between the approximately refracted points and their corresponding precisely refracted points serves as error function. The results are shown in table 2.

TABLE 1

Comparison between precise refraction and approximated refraction.

| Displacement caused by refraction (mm) | Minimal | Maximal | Average |
|---|---|---|---|
| Precise Method | 3.75 | 10.34 | 6.08 |
| Approximation Method | 3.53 | 9.78 | 5.95 |

TABLE 2

Average deviation between precise method and approximation.

| | Minimal | Maximal | Average |
|---|---|---|---|
| Deviation (mm) | 0.03 | 1.38 | 0.19 |

Note that the average deviation between the precise method and approximation is far below the average positional accuracy of the electromagnetic tracking device, as described in the next subsection. Thus, a higher optical distortion is caused by the inaccurate head-tracker than by applying the approximation to correct refraction misalignments. However, if refraction is not dealt with at all, the resulting optical distortion is higher than the one caused by tracking-errors.

Note also, that the presented approximation is only correct for plane parallel plates. If the mirror is bent, the normals at the intersections of the in-refractor and the out-refractor differ. However, we approximated this by assuming that the mirror's flexion is small and the two normals are roughly equivalent. Determining both normals is computationally too expensive for interactive applications, and does not result in major visual differences in our system.

Non-optical Distortion

Accurate registration requires accurate tracking. In addition to the non-linear tracking-distortion, end-to-end system delay (time difference between the moment that the tracking system measures a position/orientation and the moment the system reflects this measurement in the displayed image) or lag causes a "swimming effect" (virtual objects appear to float around real objects).

However, since ideal tracking devices do not yet exist, we apply smoothing filters (sliding average windows) to filter high-frequent sub-bands (i.e. noise) from the tracking samples and prediction filters (Kalman filters (Azuma, 1995)) for orientation information, and linear prediction for position information) to reduce the swimming effect.

The applied tracking device, Ascension's Flock of Birds (Ascension Technologies. Corp. 2000), provides a static positional accuracy of 2.5 mm (by 0.75 mm positional resolution), and a static angular accuracy of 0.50° (by 0.10° angular resolution). The highest update rate (without system delay) is 100 measurements/second.

Possible Application Areas

This section describes applications for the passive space and for augmented reality. Note that these applications are purely exemplary and not exclusive Many more applications (such as information visualization, simulation, etc.) are supported by the setup.

The possible application areas of the xVT range from visualization of scientific data or simulation results in combination with real-world objects that are placed on the tabletop, over tele-cooperation scenarios to hybrid modeling and assembly.

Figure 11:
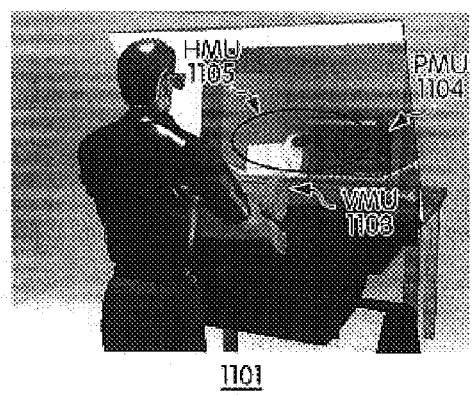
FIG. 11: Hybrid modeling and assembly at an Extended Virtual Table.

Hybrid Modeling and Assembly: FIG. 11

Virtual mock-ups (VMUs) are assemblies of computer generated product components that are used to speed up the product design process and to find more efficient and cheaper solutions. VMUs can be used to gain an impression of the components and their behavior within an assembly and to make early changes to the product before actual production begins. VR environments are becoming more and more common to support immersive and computer-aided modeling and assembly of VMUs.

However, strong references between VMUs and corresponding physical mock-ups (PMUs) don't exist until the VMUs are physically built.

In hybrid modeling and assembly applications supported by the xVT, VMUs 1103 can be modeled above the virtual workbench and then be assembled to corresponding PMUs 1104 that are located on the real workbench (cf. FIG. 11). A combination of VMUs 1103 and PMUs 1104 to hybrid mock-ups (us) 1105 supports a more realistic early design review and possible early refinements within the conceptual product design phase.

Figure 12:
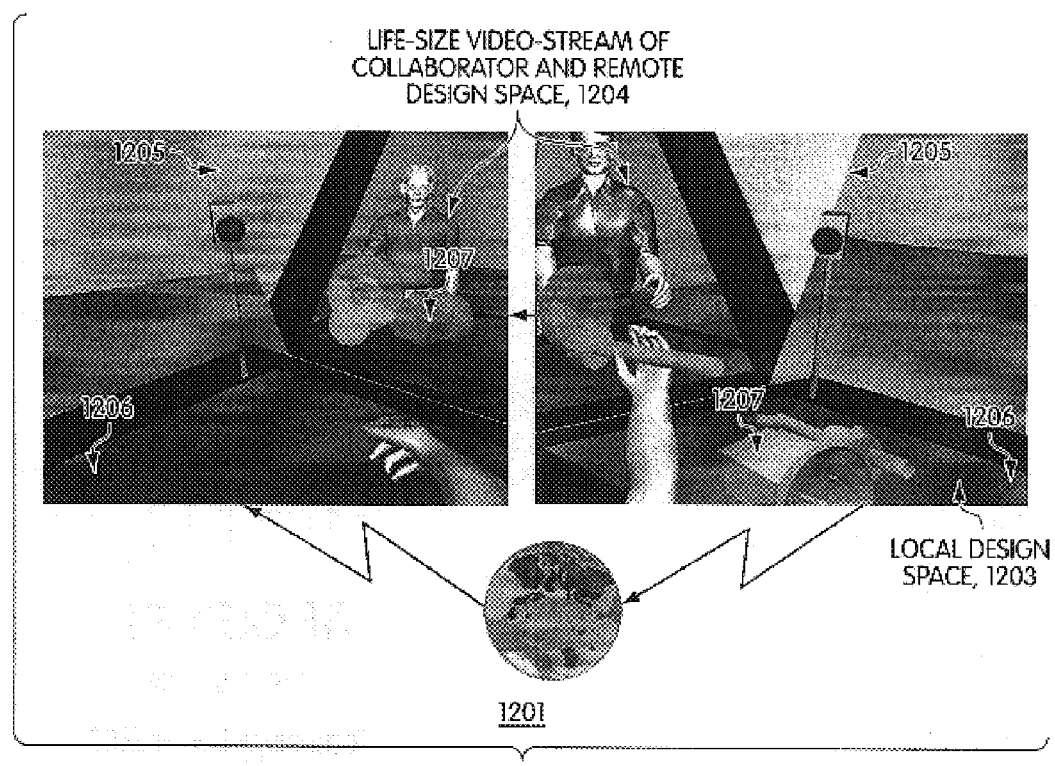
FIG. 12: Immersive tele-cooperation with Extended Virtual Tables.

Semi-immersive Tele-cooperation: FIG. 12

Globalization of business has both made tele-cooperative product development more important and increased the demands placed on it. Especially during the conceptual design phase, tele-cooperative CAD systems are currently used to support design review and modeling that are shared among several distributed parties. Two or more collaborators can bring together and discuss different virtual components within a digital design space and, thereby make use of an efficient, location-spanning form of teamwork.

The telepresence factor (i.e. the impression of being present) comes up short in most of the systems. Usually, live audio/video streams that enable users to interact with the model and to see their collaborators on a desktop screen are embedded within a shared CAD viewer. Communicating through the screen, however, barely gives an impression of presence.

The xVT can also be used to support shared design review and modeling within a semi-immersive tele-operation session (cf. FIG. 12). A stereoscopic live-sized video-stream of a remote collaborator 1204 can be visualized in the mirror 1205 of the local user—giving her the impression that the collaborator is standing right beside her virtual workbench 1206. Two or more participants that could see each other (and each other's local design space 1203) within their local mirrors 1205 and could bring together and discuss different virtual components 1207 that could be exchanged intuitively by passing them through their mirrors. Thereby, they make use of an efficient, location-spanning form of teamwork.

Embedding the display technology into the real environment potentiality opens new application areas for Augmented Reality—as it did for Virtual Reality. However, such projection-based AR/VR displays will not substitute for head-attached displays, but rather present an application-specific alternative.

Comparison to Traditional Head-attached Displays (Pros and Cons)

Pros

The projection-based AR concept (the xVT represents an example of a projection-based AR device) detaches the display device from the user and consequently addresses some of the drawbacks of head-mounted displays by benefiting from advantages of the well established projection-based VR approach:

Our experiments have shown that the optical characteristics (such as field of view, resolution, and image brilliance)

of our current setup are comparable with the optical characteristics of high-end optical see-through HMDs. However, in contrast to HMDs, the utilized projection technology is scalable—both, in resolution and field-of-view. Addressing the ergonomic factor, glasses that have to be worn if active or passive shuttering is applied are much lighter and less cumbersome than head-mounted displays. Furthermore, since the reflected image plane can be spatially better aligned with the real environment that has to be augmented, the fixed focal length problem that is related to head-mounted displays (where the image plane is attached to the viewer) is reduced. Consequently, an easier eye accommodation is supported.

Patrick, et al. (2000) and Johnson and Steward (1999) indicate that statistically no significant difference in acquiring spatial knowledge can be found between closed-view HMDs and large projection screen conditions. However, they also state that the lower-cost projection screens are an attractive alternative to expensive and uncomfortable (i.e. discomfort due to the poor ergonomics and simulation sickness that is due to fast head-motions) HMDs. These findings can also be applied with regard to optical see-through HMDs and projection-based AR devices.

Beside these individual drawbacks, head-attached displays in general (i.e. head-mounted displays, head-mounted projective displays (Parsons & Rolland, 1998; Inami, et al., 2000) and projective head-mounted displays (Kijirna & Ojika, 1997), etc.), suffer from an imbalanced ratio between heavy optics (lenses, displays and projectors) that results in cumbersome and uncomfortable devices and ergonomic devices with a low image quality. This ratio can be better balanced by introducing devices that detach the display technology and the supporting optics from the user.

Cons

However, the xVT lacks in three major factors: mobility, direct interaction with augmented real objects, and single user application.

We believe that stable and precise long-range tracking will exist in the near future, enabling AR applications using HMDs and head-mounted projector displays to be highly mobile. Nevertheless, the intention of the xVT is to combine two table-like workplaces where the users focus on the workspace above the workbenches. For this, we neither require long-range tracking, nor a high degree of mobility.

HMDs also offer direct interaction with augmented real objects that are within arm's length of the user. In case of the xVT, the mirror represents a physical barrier for the user's hands and the input devices and mostly prevents direct interaction with superimposed objects. We can either directly interact with real objects on the real workbench and with virtual objects on the virtual workbench or indirectly interact with virtual objects above the real workbench (through the mirror). Finding additional interaction metaphors that support a more convenient and more realistic handling of the superimposed real workspace belongs to our future research. Additional mechanical devices on the real workbench (such as a turntable or robot arms) can be useful for remotely interacting with real objects. Input devices that are better suited for indirect interaction (such as the Cubic Mouse, Fröhlich & Plate, 2000) can be used in addition to traditional input tools. Those devices will provide force feedback in upcoming versions which makes a direct interaction more convincing.

While HMDs provide an individual image plane for each participant of a multiple user session, users of large projection systems have to share the same image plane, making multiple user scenarios difficult to realize with such technology. The xVT faces the same problem. Although some solutions exist that simultaneously support two users (e.g., Agrawala et al., 1997), they are not widely applied since they require special hardware.

The xVT's non-simultaneous viewing of the two projection spaces (in front of the mirror and behind it) can be either interpreted as a disadvantage—since the application of a second projector and a another diff-use projection plane would support simultaneous viewing (as is the case with L-shaped workbenches)—or as an advantage—since no second projector is required. However, an additional opaque projection plane would make the see-through mode impossible. Instead, a front-projected or rear-projected semi-transparent (non-reflective), or a rear-projected holographic projection plane (e.g. Pronova, 2001) could be applied—but either at the cost of image quality or on the cost of viewing range (compared to the much better optical see-through characteristic of half-silvered mirrors).

Conclusion

The inventors have disclosed herein the best mode presently known to them of making and using a virtual environment system that has been extended with a mirror. The preferred embodiment is implemented in a virtual reality table, but the techniques can be used in any situation where the virtual reality is being produced on a projection plane. The mirror can be used to extend the area of virtual reality seen by the user or it can be used to display other images or information of interest to the user. If the mirror is transflective, the virtual environment reflected in the mirror can be used to augment real objects located behind the mirror. The inventors have disclosed a number of applications, including extending virtual reality, using the mirror as a magic lens, using it to show collaborators, and augmenting real objects. However, it will be immediately apparent to those skilled in the art that there is no limit to the applications that can use the techniques disclosed herein.

For all of the foregoing reasons, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

What is claimed is:

1. A virtual environment system comprising:

apparatus for producing a virtual environment on a projection plane;

a planar mirror, the planar mirror being of substantial size relative to the projection plane and being positioned relative to the projection plane such that the plane of the mirror intersects the projection plane and the angle of the mirror relative to the projection plane is such that a user of the system who looks at the mirror sees the projection plane reflected therein; and a tracker that tracks the position and orientation of the eyes of a user of the virtual environment system, the apparatus for producing the virtual environment receiving a current position of the mirror and producing a first virtual environment on the projection plane when the tracker indicates that the user is looking at the mirror and a second virtual environment on the projection plane when the tracker indicates that the user is looking at the projection plane.

2. The virtual environment system set forth in claim 1 wherein:

the user may move a virtual object produced in the apparatus between the first and second virtual environments.

3. The virtual environment system set forth in claim 1 wherein:
the first virtual environment is coherent with the second virtual environment.

4. The virtual environment system set forth in claim 3 wherein:
the mirror divides a space having a single global coordinate system, the single global coordinate system being employed by the apparatus to produce the virtual environment.

5. The virtual environment system set forth in claim 4 wherein:
the first virtual environment is a view of the portion of the virtual environment which is behind the mirror in the global coordinate system as it would be seen from the direction and point of view of the user if the mirror were transparent and the user were looking through the mirror into the global coordinate system.

6. The virtual environment system set forth in claim 1 wherein:
the first virtual environment is not coherent with the second virtual environment.

7. The virtual environment system set forth in claim 6 wherein:
the mirror functions as a magic lens.

8. The virtual environment system set forth in claim 1 wherein:
the mirror divides a space having a single global coordinate system, the single global coordinate system being employed by the apparatus for producing the virtual environment.

9. The virtual environment system set forth in claim 8 wherein:
the mirror is transflective when there is a light source on the side of the mirror that does not reflect the projection plane.

10. The virtual environment system set forth in claim 9 further comprising:
a real object, the real object being visible through the mirror by a user of the virtual environment system when the mirror is transflective and having a location in the global coordinate system,
the apparatus for producing the virtual environment responding to the location of the real object by producing a virtual object in the first virtual environment that is reflected in the mirror such that the virtual object augments the real object.

11. The virtual environment system set forth in claim 10 wherein:
the virtual object is a representation of an object that is intended to fit together with the real object.

12. The virtual environment system set forth in claim 11 wherein:
the real object is a physical mockup and the virtual object is a virtual mockup.

13. The virtual environment system set forth in claim 6 wherein:
the apparatus for producing a virtual environment is attached to a video camera aimed at another such apparatus by a network; and
the first virtual environment includes a view of the other apparatus for producing a virtual environment and the other apparatus' users, the view being produced by the video camera.

14. The virtual environment system set fort in claim 13 wherein:
the other apparatus is another virtual environment system and is attached via the network to another video camera aimed at the apparatus for producing a virtual environment and the first virtual environment in the other virtual environment system includes a view of the virtual environment system and the virtual environment system's users.

15. The virtual environment system set forth in claim 14 wherein:
the apparatus for producing a virtual environment in the virtual environment system and the apparatus for producing a virtual environment in the other virtual environment system further include a microphone and a loudspeaker, the loudspeaker in each of the systems receiving input via the network from the microphone in the other system.

* * * * *